(12) United States Patent
Ohnishi

(10) Patent No.: US 8,482,572 B2
(45) Date of Patent: Jul. 9, 2013

(54) STORAGE MEDIUM HAVING STORED THEREON COLOR CONVERSION PROGRAM, AND COLOR CONVERSION APPARATUS

(75) Inventor: Naonori Ohnishi, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 784 days.

(21) Appl. No.: 12/553,348

(22) Filed: Sep. 3, 2009

(65) Prior Publication Data

US 2009/0315911 A1 Dec. 24, 2009

Related U.S. Application Data

(63) Continuation-in-part of application No. 12/153,365, filed on May 16, 2008.

(30) Foreign Application Priority Data

May 2, 2008 (JP) .................................. 2008-120380
Sep. 26, 2008 (JP) .................................. 2008-249017

(51) Int. Cl.
*G06T 1/00* (2006.01)
*G09G 5/00* (2006.01)
*G09G 5/02* (2006.01)

(52) U.S. Cl.
USPC ............................ 345/522; 345/600; 345/604

(58) Field of Classification Search
None
See application file for complete search history.

(56) References Cited

U.S. PATENT DOCUMENTS

| | | | |
|---|---|---|---|
| 6,125,200 A | 9/2000 | Warnock | |
| 6,940,523 B1 | 9/2005 | Evoy | |
| 7,769,231 B2 * | 8/2010 | Hong et al. | 382/167 |
| 7,920,146 B2 | 4/2011 | Yamada | |
| 8,023,164 B2 * | 9/2011 | Ogawa | 358/518 |
| 8,098,259 B2 * | 1/2012 | Kondo et al. | 345/594 |
| 2003/0081831 A1 | 5/2003 | Fukao et al. | |
| 2006/0001928 A1 * | 1/2006 | Hayaishi | 358/518 |
| 2006/0017855 A1 | 1/2006 | Yamada | |
| 2006/0028483 A1 | 2/2006 | Kondo et al. | |

(Continued)

FOREIGN PATENT DOCUMENTS

| | | |
|---|---|---|
| JP | 8-163541 | 6/1996 |
| JP | 8-293995 | 11/1996 |
| JP | 2006-203595 | 8/2006 |

OTHER PUBLICATIONS

European Search Report issued in EP Appl 08 01 1916 on Oct. 17, 2011.

(Continued)

*Primary Examiner* — Kee M Tung
*Assistant Examiner* — Leon T Cain, II
(74) *Attorney, Agent, or Firm* — Nixon & Vanderhye PC

(57) ABSTRACT

Display control means displays, on display means, an image based on first conversion target image data in which color information is set for each of a plurality of image elements. Coordinate determination means determines a first coordinate in accordance with an instruction performed by using the pointing device. Conversion target condition setting means obtains color information of an image element, in the first conversion target image data, which corresponds to the first coordinate, and sets a first conversion target condition in accordance with the obtained color information. Color conversion means performs color conversion processing of changing color information of an image element, in the first conversion target image data, which satisfies the first conversion target condition, and displays an after-conversion image on the display means.

23 Claims, 18 Drawing Sheets

U.S. PATENT DOCUMENTS

| | | |
|---|---|---|
| 2006/0119870 A1 | 6/2006 | Ho et al. |
| 2007/0121180 A1 | 5/2007 | Ogawa |
| 2007/0153341 A1 | 7/2007 | Kang |
| 2007/0165946 A1 | 7/2007 | Hong et al. |
| 2008/0088826 A1 | 4/2008 | Ohyama et al. |
| 2009/0010535 A1 | 1/2009 | Koishi |
| 2009/0273609 A1 | 11/2009 | Ohnishi |
| 2009/0273615 A1 | 11/2009 | Ohnishi |

OTHER PUBLICATIONS

Apr. 28, 2011 Office Action from U.S. Appl. No. 12/153,365.

Office Action issued Jun. 8, 2011 in U.S. Appl. No. 12/216,170.
Office Action issued in U.S. Appl. No. 12/216,170 on Oct. 26, 2011.
Office Action issued in U.S. Appl. No. 12/153,365 on Sep. 16, 2011.
Office Action mailed Jul. 20, 2012 from U.S. Appl. No. 12/216,170.
Office Action mailed Jan. 19, 2012 from U.S. Appl. No. 12/153,365.
Advisory Action mailed May 7, 2012 from U.S. Appl. No. 12/153,365.
Office Action mailed Oct. 3, 2012 from U.S. Appl. No. 12/153,365.
Office Action mailed Feb. 22, 2013 from U.S. Appl. No. 12/216,170.
Notice of Allowance mailed Feb. 7, 2013 from U.S. Appl. No. 12/153,365.

* cited by examiner

F I G. 4
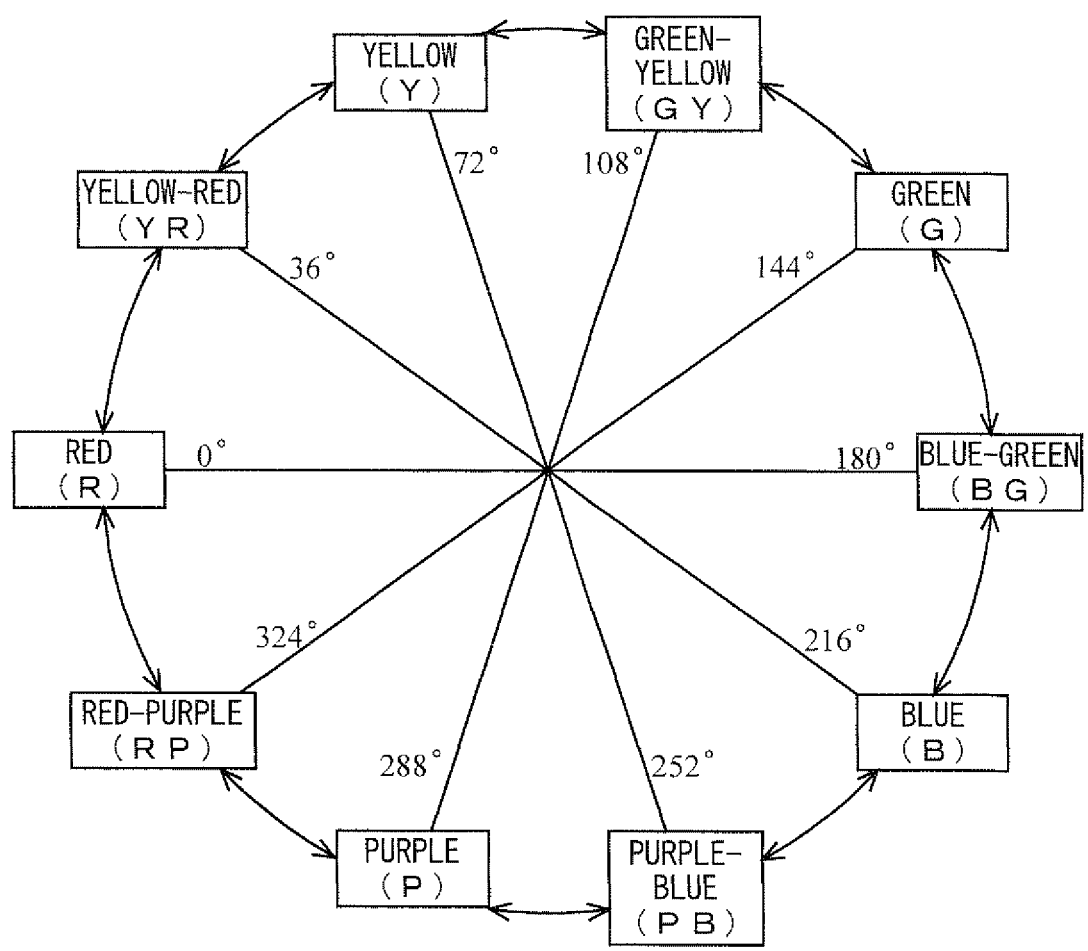

F I G. 8
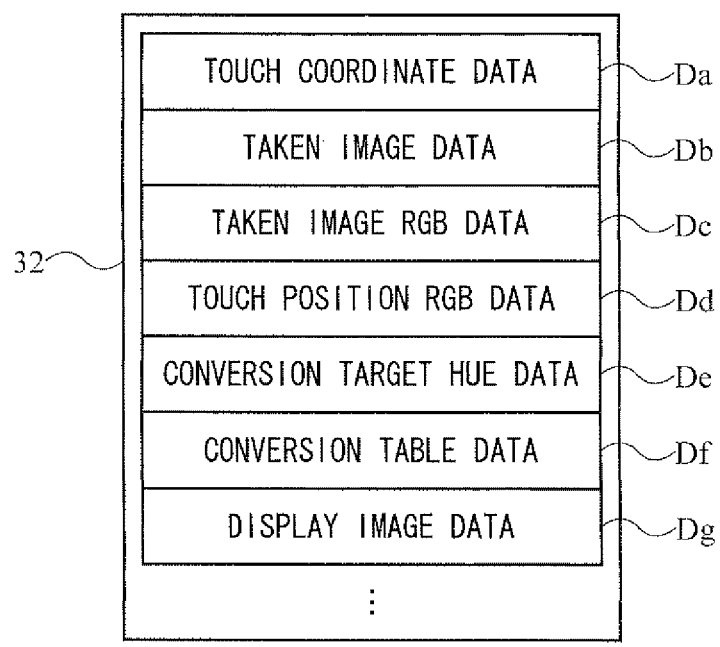

STORAGE MEDIUM HAVING STORED THEREON COLOR CONVERSION PROGRAM, AND COLOR CONVERSION APPARATUS

CROSS REFERENCE TO RELATED APPLICATION

This application is a Continuation-In-Part of U.S. patent application Ser. No. 12/153,365 filed 16 May 2008; which claims priority of Japanese Patent Application No. 2008-120380 filed 2 May 2008; and Japanese Patent Application No. 2008-249017, filed 26 Sep. 2008, the entire contents of which are hereby incorporated by reference.

BACKGROUND OF THE INVENTION

1. Field of the Invention

The present invention relates to a storage medium having stored thereon a color conversion program, and a color conversion apparatus, and more particularly, to a storage medium having stored thereon a color conversion program, and a color conversion apparatus, which convert a color in a displayed image.

2. Description of the Background Art

Conventionally, for example, as disclosed in Japanese Laid-Open Patent Publication No. 8-293995 (hereinafter, referred to as Patent Document 1), there have been developed various apparatuses for converting a color of a displayed image into a color desired by a user. An image processing apparatus disclosed in the Patent Document 1 extracts hue, saturation, and brightness of a pixel corresponding to a position designated by the user, and determines maximum and minimum values of these components. Then, when the user designates a color which is desired to change to, the image processing apparatus converts colors of pixels in a previously determined range into the designated color.

However, by the user designating a plurality of positions with respect to a scanned still image, the image processing apparatus disclosed in the Patent Document 1 sets a minimum value to a maximum value of each of hue, saturation, and brightness of each of pixels corresponding to the plurality of positions as a range to be color-converted. Thus, the user needs to designate a plurality of positions with respect to an image in performing color conversion, and an operation becomes troublesome. Further, if the user designates only a single position in performing color conversion, a range to be color-converted is a pinpoint, and it is considered that color conversion with respect to an image is hardly performed. Further, the image processing apparatus disclosed in the above Patent Document 1 takes a scanned static image as a target for color conversion. For example, when an image being taken by a camera is displayed in real time (i.e. displaying of a live image), the image processing apparatus cannot take the live image as a target for color conversion.

SUMMARY OF THE INVENTION

Therefore, an object of the present invention is to provide a storage medium having stored thereon a color conversion program, and a color conversion apparatus, which solve one of the above problems and are capable of performing color conversion desired by a user with respect to a displayed image in accordance with a simple operation.

The present invention has the following features to attain the object mentioned above. It is noted that reference characters, step numbers, and supplementary explanations in parentheses are merely provided to facilitate the understanding of the present invention in relation to the later-described embodiment, rather than limiting the scope of the present invention in any way.

A first aspect of the present invention is a computer-readable storage medium having stored thereon a color conversion program executed by a computer (31) of an information processing apparatus (1) that is capable of using an output of a pointing device (13) that is capable of performing a coordinate input with respect to predetermined display means (12). The color conversion program causing the computer to function as display control means (a CPU 31 executing step 52; hereinafter, only step numbers are indicated), coordinate determination means (S54), conversion target condition setting means (S55, S56), and color conversion means (S57). The display control means displays, on the display means, an image based on first conversion target image data in which color information is set for each of a plurality of image elements. The coordinate determination means determines a first coordinate (TP) in accordance with an instruction performed by using the pointing device (Da). The conversion target condition setting means obtains color information of an image element, in the first conversion target image data, which corresponds to the first coordinate, and sets a first conversion target condition in accordance with the obtained color information (De). The color conversion means performs color conversion processing of changing color information of an image element, in the first conversion target image data, which satisfies the first conversion target condition, and displays an after-conversion image on the display means. It is noted that the pointing device is an input device for designating an input position or coordinates on a screen, and realized, for example, by a touch panel, a mouse, a trackpad, a trackball, a pen tablet, a joystick, a system for detecting a screen position at which a housing of a game controller is pointed, and the like. Further, the above image elements are, for example, pixels, but an image that is a block consisting of a plurality of pixels may be each image element. Further, the image based on the above first conversion target image data may be an image that is based on the first conversion target image data without change, or may be an image obtained by performing predetermined image processing (e.g. processing of changing saturation or brightness) on the first conversion target image data.

According to the above, when the image based on the first conversion target image data is displayed on the display means, it is possible to perform color conversion of the display image, which is desired by the user, only by the user once performing an operation of designating a coordinate by using the pointing device.

Further, each image element may be a pixel. In this case, the color conversion means may display, on the display means, an after-conversion image that is obtained by performing color conversion processing of changing color information of a pixel satisfying the first conversion target condition, among each pixel of the image based on the first conversion target image data.

According to the above, it is possible to perform color conversion of the display image, which is desired by the user, with color information of a pixel designated by the user using the pointing device being set as a reference.

Further, when the after-conversion image is displayed on the display means by the color conversion means, the coordinate determination means may newly determine a second coordinate in accordance with an instruction obtained from the pointing device. In this case, the conversion target condition setting means may obtain color information of an image element, in the first conversion target image data, which corresponds to the second coordinate, and may set a second conversion target condition in accordance with the obtained color information. The color conversion means may perform color conversion processing of changing color information of each image element, in the first conversion target image data, which satisfies the first conversion target condition or the second conversion target condition.

According to the above, when the user inputs a plurality of coordinates, color conversion can be performed in accordance with each coordinate.

Further, the color conversion program may also cause the computer to function as image obtaining means (23, 25). The image obtaining means obtains second conversion target image data that is different from the first conversion target image data. In this case, the color conversion means may perform color conversion processing of changing color information of each pixel, in the second conversion target image data, which satisfies the first conversion target condition, and may display an after-conversion image on the display means.

According to the above, because the conversion target condition is fixed even when the conversion target image data is changed, even when conversion target image data is repeatedly outputted (e.g. when taken images are repeatedly outputted in real time), the images can be sequentially color-converted and displayed.

Further, the conversion target condition setting means may set, as the first conversion target condition, a condition related to at least one of hue, saturation, and brightness.

According to the above, when only color information of an image element that overlaps with a coordinate inputted by the user is color-converted, an extremely limited region (in an extreme case, only the pixel that overlaps with the coordinate inputted by the user) in the conversion target image data is thought to be color-converted, and it becomes a state where color conversion desired by the user cannot be performed. On the other hand, it is rare for the user to desire to perform color conversion of only limited color information designated by an inputted coordinate, and the user generally desires to perform color conversion of color information in a certain range including the color information. According to the above, because not only the color information in accordance with the coordinate inputted by the user, but also color information included in a predetermined range of at least one of hue, saturation and brightness are targeted for color conversion, color information slightly different from the color information of the pixel that overlaps with the coordinate can be a color conversion target, and it is possible to perform color conversion desired by the user.

Further, the conversion target condition setting means may set, based on a hue of the obtained color information, a hue-related condition, as the first conversion target condition.

According to the above, when the color conversion target is limited only to the hue of the image element that overlaps with the coordinate inputted by the user and color conversion is performed, an extremely limited region (in an extreme case, only the pixel that overlaps with the coordinate inputted by the user) in the conversion target image data is thought to be color-converted, and it becomes a state where color conversion desired by the user cannot be performed. On the other hand, it is rare for the user to desire to perform color conversion of only a limited hue designated by an inputted coordinate, and the user generally desires to perform color conversion of hues in a certain range including the hue. According to the above, because not only the hue in accordance with the coordinate inputted by the user, but also hues included in a predetermined range are targeted for color conversion, a hue slightly different from the hue of the pixel that overlaps with the coordinate can be a color conversion target, and it is possible to perform color conversion desired by the user.

Further, the color conversion means may change at least one of a saturation, a brightness, and a hue of a color of an image element that satisfies the first conversion target condition, with respect to the first conversion target image data. Further, a method for the color conversion means to change at least one of saturation, brightness, and hue may be realized by changing a data table (e.g. a conversion table) in which saturation, brightness, and hue for displaying the image are defined, data indicative of at least one of saturation, brightness, and hue among image data maybe directly changed, or at least one of saturation, brightness, and hue may be changed by another method.

According to the above, when the image based on the first conversion target image data is displayed on the display means, it is possible to perform color conversion of changing at least one of a saturation, a brightness, and a hue of an image element satisfying the conversion target condition, only by the user once performing an operation of designating a coordinate by using the pointing device.

Further, the color conversion means may change a hue of an image element satisfying the first conversion target condition into the conversion target hue, with respect to the first conversion target image data.

According to the above, when the image based on the first conversion target image data is displayed on the display means, it is possible to perform color conversion of changing a hue of an image element satisfying the conversion target condition into the conversion target hue, only by the user once performing an operation of designating a coordinate by using the pointing device.

Further, the conversion target condition setting means may obtain a hue of the image element corresponding to the first coordinate, and may set, as the first conversion target condition, a predetermined hue range having the obtained hue at a center thereof. In this case, the color conversion means may change a hue of an image element which is close to the center of the hue range, among each image element having a hue within the hue range of the first conversion target condition, into a hue closer to a predetermined conversion target hue as compared to an image element having a hue distant from the center of the hue range.

Further, the color conversion means may increase a change amount from color information, in the first conversion target image data, of an image element having a hue close to the center of the hue range, among each image element having a hue within the hue range of the first conversion target condition, as compared to an image element having a hue distant from the center of the hue range.

According to the above, with a hue, which is set in accordance with an inputted coordinate, being set as a center, a hue is set so as to be closer to the conversion target hue than the original hue as getting closer to the center. Thus, noise can be reduced in performing color conversion, and it is possible to convert into an image in which color is naturally changed.

Further, the conversion target condition setting means may set, as the first conversion target condition, a first range including the color information of the image element corresponding to the first coordinate, and may set, as the second conversion target condition, a second range including the color information of the image element corresponding to the second coordinate. In this case, for each image element, in the first conversion target image data, which has color information within the first range, the color conversion means: may set, to 0, a change amount from color information, in the first conversion target image data, of an image element having first color information that is color information at a boundary of the first range; may set, to a predetermined amount, a change amount from color information, in the first conversion target image data, of an image element having second color information that is color information at a predetermined non-boundary portion of the first range; and may sets a change amount from color information, in the first conversion target image data, of each image element having color information other than the first color information and the second color information among color information within the first range, so as to be gradually increased as color information gets closer to the second color information from the first color information. Further, for each image element, in the first conversion target image data, which has color information within the second range, the color conversion means also: may sets, to 0, a change amount from color information, after color conversion for the first conversion target condition, of an image element having third color information that is color information at a boundary of the second range; may set, to a predetermined amounts, a change amount from color information, after the color conversion for the first conversion target condition, of an image element having fourth color information that is color information at a predetermined non-boundary portion of the second range; and may sets a change amount from color information, in the first conversion target image data, of each image element having color information other than the third color information and the fourth color information among color information within the second range, so as to be gradually increased as color information gets closer to the fourth color information from the third color information. It is noted that the change of the color information by the above color conversion means includes a relation as shown in FIG. 17B.

According to the above, when the user designates a plurality of coordinates and color conversion is performed with respect to color information in accordance with each coordinate, rates of changing attribute parameters with respect to color information within a range where ranges for the color conversions overlap with each other can be smoothly connected, and it is possible to convert into an image such that a plurality of color conversions are naturally performed.

Further, the color conversion means may change a hue of each image element which is within the hue range of the first conversion target condition such that, with respect to hue, within the hue range of the first conversion target condition, which is distant from the center of the hue range, a rate of causing the hue to get close to the conversion target hue is gradually decreased in accordance with a Hermite curve as the hue gets away from the center.

According to the above, with a hue, which is set in accordance with an inputted coordinate, being set as a center, a hue is set so as to be closer to the conversion target hue than the original hue in accordance with the Hermite curve as getting closer to the center. Thus, it is possible to perform smooth color conversion, and noise can be reduced more in performing color conversion.

Further, the color conversion means may sets the conversion target hue based on a hue of the obtained color information.

According to the above, when the user performs an operation of designating different hues with respect to the image being displayed, it is possible to perform color conversion such that an image element having each hue is converted such that the hue gets close to a different hue.

Further, the color conversion means may sequentially change the conversion target hue as time passes, and displays a resultant image on the display device.

According to the above, it is possible to convert into an image in which a hue that is set in accordance with an inputted coordinate is sequentially changed as time passes.

Further, the display control means may perform image processing of increasing saturation with respect to each image element of the first conversion target image data, and may display an achromatic image on the display means. In this case, the color conversion means may perform color conversion processing of returning saturation of each image element satisfying the first conversion target condition, among each image element of the achromatic first conversion target image data, and may display an after-conversion image on the display means.

According to the above, only by the user once performing an operation with respect to the achromatic image displayed on the display means to designate a position at which a color desired by the user is originally expressed in a conversion target image (original image), it is possible to perform color conversion such that the color is restored in the achromatic image.

Further, the conversion target condition setting means may set, as the first conversion target condition, having a hue included in a predetermined range having a hue of the obtained color information as a center thereof. In this case, the color conversion means may perform color conversion processing of changing saturation of an image element having a hue included in the predetermined range which is away from the center that is the hue of the obtained color information while gradually decreasing a rate of returning the saturation of the image element to saturation in the first conversion target image data as the hue gets away from the center, and may display an after-conversion image on the display means.

Further, the color conversion means may change saturation of an image element having a hue within the predetermined range which is away from the center of the predetermined range while linearly decreasing a rate of returning the saturation of the image element to saturation in the first conversion target image data from 100% to 0% as the hue gets away from the center.

According to the above, with a hue, which is set in accordance with an inputted coordinate, being set as a center, a saturation is set so as to be gradually decreased. Thus, noise can be reduced in performing color conversion, and it is possible to convert into an image in which the color that is originally expressed at the above coordinate is naturally added.

Further, the color conversion means may change saturation of an image element having a hue within a predetermined range which is away from the center of the predetermined range while linearly decreasing a rate of returning the saturation of the image element to saturation in the first conversion target image data from 100% to 0% in accordance with a Hermite curve as the hue gets away from the center.

According to the above, with a hue, which is set in accordance with an inputted coordinate, being set as a center, a saturation is set so as to be gradually decreased in accordance with the Hermite curve. Thus, noise can be reduced more in performing color conversion.

Further, the conversion target condition setting means may obtain a hue of the image element, in the first conversion target image data, which corresponds to the first coordinate, and may set as a hue range of the first conversion target condition, a predetermined hue range having the obtained hue at a center thereof. In this case, the color conversion means may perform color conversion processing of changing at least one of saturation, brightness, and hue with respect to an image element, in the first conversion target image data, which has a hue within the hue range of the first conversion target condition, and may display an after-conversion image on the display means. When the after-conversion image is displayed on the display means by the color conversion means, the coordinate determination means may newly determine a second coordinate in accordance with an instruction obtained from the pointing device. The conversion target condition setting means may obtain a hue of an image element, in the first conversion target image data, which corresponds to the second coordinate, and may set, as a hue range of the second conversion target condition, a predetermined hue range having the obtained hue at a center thereof. The color conversion means may perform color conversion processing of changing at least one of saturation, brightness, and hue with respect to an image element, in the first conversion target image data, which has a hue within the hue range of the second conversion target condition, and may display an after-conversion image on the display means.

According to the above, when the user designates a plurality of coordinates, it is possible to perform color conversion with respect to a hue in accordance with each coordinate.

Further, the color conversion means may change at least one of a saturation and a brightness of an image element having a hue within the hue range of the first conversion target condition which is away from the center of the hue range while gradually decreasing a rate of changing at least one of the saturation and the brightness of the image element as the hue gets away from the center, the color conversion means may change at least one of a saturation and a brightness of an image element having a hue within the hue range of the second conversion target condition which is away from the center of the hue range while gradually decreasing a rate of changing at least one of the saturation and the brightness of the image element as the hue gets away from the center. When the hue range of the first conversion target condition and the hue range of the second conversion target condition partially overlap with each other, the color conversion means may select a higher rate among a rate of changing at least one of saturation and brightness for the hue range of the first conversion target condition and a rate of changing at least one of saturation and brightness for the hue range of the second conversion target condition, and may change at least one of a saturation and a brightness of a image element having a hue within the overlapping range.

Further, the color conversion means may change at least one of a saturation and a brightness of an image element having a hue within the hue range of the first conversion target condition which is away from the center of the hue range of the first conversion target condition while gradually decreasing a rate of changing at least one of the saturation and the brightness of the image element as the hue gets away from the center, and the color conversion means may change at least one of a saturation and a brightness of an image element having a hue within the hue range of the second conversion target condition which is away from the center of the hue range of the second conversion target condition while gradually decreasing a rate of changing at least one of the saturation and the brightness of the image element as the hue gets away from the center. When the hue range of the first conversion target condition and the hue range of the second conversion target condition partially overlap with each other, the color conversion means may change a rate of changing at least one of a saturation and a brightness of an image element having a hue within the overlapping range in a curved manner such that a center of the overlapping range becomes minimum.

According to the above, when the user designates a plurality of coordinates and color conversion is performed with respect to a hue in accordance with each coordinate, rates of changing attribute parameters with respect to color information within a range where ranges for the color conversions overlap with each other can be smoothly connected, and it is possible to convert into an image such that a plurality of color conversions are naturally performed.

Further, the information processing apparatus may also comprise imaging means (23, 25). The imaging means takes an image of a vicinity of the information processing apparatus. In this case, the display image display control means may use image data taken by the imaging means as the first conversion target image data, and may display, on the display means, an image based on the image data in real time.

According to the above, it is possible to perform color conversion processing with respect to a taken real-time image.

Further, the display image display control means may display, on the display means, a chromatic image based on the first conversion target image data. In this case, the conversion target condition setting means may obtain a hue of the image element, in the first conversion target image data, which corresponds to the first coordinate, and may set, as a hue range of the first conversion target condition, a predetermined hue range having the obtained hue at a center thereof. The color conversion means may perform color conversion processing of decreasing a saturation of an image element, in the first conversion target image data, which has a hue within the hue range of the first conversion target condition, thereby converting into a chromatic image, and may display an after-conversion image on the display means.

According to the above, only by the user once performing an operation with respect to the chromatic image displayed on the display means to designate a position at which a color desired by the user is displayed, it is possible to perform color conversion such that the designated color in the chromatic image becomes an achromatic color.

Further, the display image display control means may convert all image elements in the chromatic first conversion target image data into black pixels by decreasing the brightness of all the image elements, and may display a resultant image on the display means. In this case, the conversion target condition setting means may obtain a hue of the image element, in the first conversion target image data, which corresponds to the first coordinate, and may set, as a hue range of the first conversion target condition, a predetermined hue range having the obtained hue at a center thereof. The color conversion means returns a brightness of an image element, in the first conversion target image data, which has a hue within the hue range of the first conversion target condition, to a brightness in the first conversion target image data, and may display a resultant image on the display means.

According to the above, only by the user once performing an operation with respect to an image, which is filled with black and displayed on the display means, to designate a position desired by the user, it is possible to perform color conversion such that only a color at the position designated by the user appears on the black image.

Further, the display control means may display, on the display means, a chromatic image based on the first conversion target image data. In this case, the conversion target condition setting means may obtain a hue of the image element, in the first conversion target image data, which corresponds to the first coordinate, and may set, as a hue range of the first conversion target condition, a predetermined hue range having the obtained hue at a center thereof. The color conversion means may decrease a brightness of an image element, in the first conversion target image data, which has a hue within the hue range of the first conversion target condition, and may display a resultant image on the display means.

According to the above, only by the user once performing an operation with respect to the chromatic image displayed on the display means to designate a position at which a color desired by the user is displayed, it is possible to perform color conversion such that the color designated in the chromatic image is converted into a dark color.

Further, the conversion target condition setting means may obtain a hue of the image element, in the first conversion target image data, which corresponds to the first coordinate, and may set, as a hue range of the first conversion target condition, a predetermined hue range having the obtained hue at a center thereof. In this case, the color conversion means may perform color conversion processing of changing a hue of an image element, in the first conversion target image data, which is within the hue range of the first conversion target condition into a first conversion target hue, and may display an after-conversion image on the display means. When the after-conversion image is displayed on the display means by the color conversion means, the coordinate determination means may newly determine a second coordinate in accordance with an instruction obtained from the pointing device. The conversion target condition setting means may obtain a hue of an image element, in the first conversion target image data, which corresponds to the second coordinate, and may set, as a hue range of the second conversion target condition, a predetermined hue range having the obtained hue at a center thereof. The color conversion means may perform color conversion processing of changing a hue of an image element, in the first conversion target image data, which is within the hue range of the second conversion target condition into a second conversion target hue, and may display an after-conversion image on the display means. It is noted that the first conversion target hue and the second conversion target hue are the same or different form each other.

According to the above, when the user performs an operation of designating different hues with respect to the display image, it is possible to perform color conversion such that a pixel having each hue is converted so as to be close to the first conversion target hue or the second conversion target hue.

Further, when the hue range of the first conversion target condition and the hue range of the second conversion target condition partially or entirely overlap with each other, the color conversion means may change a hue obtained by change for the hue range of the first conversion target condition, with respect to an image element having a hue within the overlapping range, so as to be close to the second conversion target hue based on the hue obtained by change for the hue range of the first conversion target condition.

According to the above, when the user designates a plurality of coordinates and color conversion is performed with respect to a hue corresponding to each coordinate, hue conversion performed with respect to hues within a range where ranges for the color conversions overlap with each other can be smoothly connected, and it is possible to convert into an image such that a plurality of color conversion are naturally performed.

Further, the color conversion means sets the second conversion target hue based on a hue, of the after-conversion image that is displayed on the display means when the second coordinate is newly determined, which corresponds to the second coordinate.

According to the above, by the user repeating an operation of designating a coordinate, it is possible to perform color conversion such that the designated color is sequentially changed to a different color.

Further, the color conversion means may also perform color conversion processing of changing color information of an image element not satisfying the first conversion target condition, with respect to the first conversion target image data by a method different from the color conversion processing of changing the color information of the image element satisfying the first conversion target condition, and may display an after-conversion image on the display means.

According to the above, only by performing different color conversion (e.g. color conversion in which a color attribute to be changed is different, or color conversion in which a color attribute to be changed is the same but a direction of change is different) with respect to an image element not satisfying the first conversion target condition, it is possible to perform various color conversions with respect to the display image.

A second aspect of the present invention is a computer-readable storage medium having stored thereon a color conversion program executed by a computer of an information processing apparatus that is capable of using: an output of a pointing device that is capable of performing a coordinate input with respect to predetermined display means; and taken image data outputted repeatedly from predetermined imaging means. The color conversion program causes the computer to function as display control means, coordinate determination means, conversion target condition setting means, and color conversion means. The display control means sequentially displays, on the display means, an image based on the repeatedly outputted taken image data. The coordinate determination means determines a first coordinate in accordance with an instruction performed by using the pointing device. The conversion target condition setting means obtains color information of an image element, in the taken image data used for display on the display means when the first coordinate is determined, which corresponds to the first coordinate, and sets a first conversion target condition in accordance with the obtained color information. The color conversion means sequentially performs color conversion processing of changing color information of an image element satisfying the first conversion target condition, with respect to the repeatedly outputted taken image data, and sequentially displays an after-conversion image on the display means.

According to the above, even when conversion target image data is repeatedly outputted for a taken image, because the conversion target condition is fixed, the taken image can be sequentially color-converted and displayed.

Further, when the after-conversion image is sequentially displayed on the display means by the color conversion means, the coordinate determination means may newly determine a second coordinate in accordance with an instruction obtained from the pointing device. In this case, the conversion target condition setting means may obtain color information of an image element, in the taken image data used for display on the display means when the second coordinate is determined, which corresponds to the second coordinate, and may set a second conversion target condition in accordance with the obtained color information. The color conversion means may sequentially perform color conversion processing of changing color information of an image element further satisfying the second conversion target condition, with respect to the repeatedly outputted taken image data, and may sequentially display a new after-conversion image on the display means.

According to the above, even when conversion target image data is repeatedly outputted for a taken image, color conversion can be sequentially performed in accordance with each coordinate by the user inputting a plurality of coordinates.

A third aspect of the present invention is a color conversion apparatus that is capable of using an output of a pointing device that is capable of performing a coordinate input with respect to predetermined display means. The color conversion apparatus comprises display control means, coordinate determination means, conversion target condition setting means, and color conversion means. The display control means displays, on the display means, an image based on first conversion target image data in which color information is set for each of a plurality of image elements. The coordinate determination means determines a first coordinate in accordance with an instruction performed by using the pointing device. The conversion target condition setting means obtains color information of an image element, in the first conversion target image data, which corresponds to the first coordinate, and sets a first conversion target condition in accordance with the obtained color information. The color conversion means performs color conversion processing of changing color information of an image element, in the first conversion target image data, which satisfies the first conversion target condition, and displays an after-conversion image on the display means.

A fourth aspect of the present invention is a color conversion apparatus that is capable of using: an output of a pointing device that is capable of performing a coordinate input with respect to predetermined display means; and taken image data outputted repeatedly from predetermined imaging means. The color conversion apparatus comprises display control means, coordinate determination means, conversion target condition setting means, and color conversion means. The display control means sequentially displays, on the display means, an image based on the repeatedly outputted taken image data. The coordinate determination means determines a first coordinate in accordance with an instruction performed by using the pointing device. The conversion target condition setting means obtains color information of an image element, in the taken image data used for display on the display means when the first coordinate is determined, which corresponds to the first coordinate, and sets a first conversion target condition in accordance with the obtained color information. The color conversion means sequentially performs color conversion processing of changing color information of an image element satisfying the first conversion target condition, with respect to the repeatedly outputted taken image data, and sequentially displaying an after-conversion image on the display means.

Further, according to the above color conversion apparatus, the same advantageous effects as that of the storage medium having stored thereon the aforementioned color conversion program can be obtained.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a view showing an example of a hue circle used in the color conversion program according to first and second embodiments of the present invention;

FIG. 8 is a view showing an example of various data stored in a main memory 32 in accordance with execution of the color conversion program according to the first and second embodiments of the present invention;

FIG. 16 is a view showing an example of a color conversion target which is set using the Munsell hue circle and an example of changing a hue with respect to the color conversion target in the first embodiment of the present invention;

DESCRIPTION OF THE PREFERRED EMBODIMENTS (First Embodiment)

Figure 1:
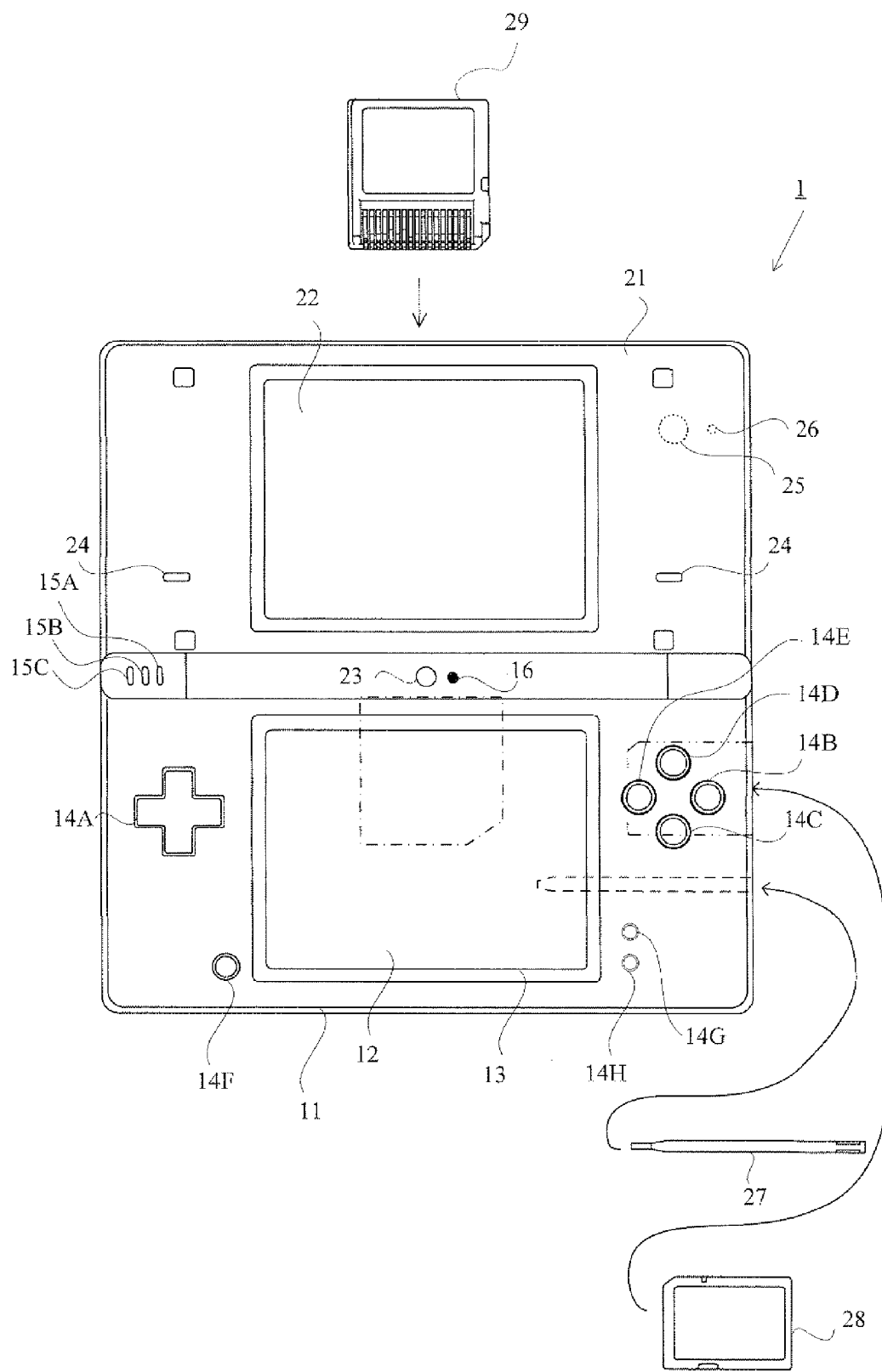
FIG. 1 is an external view of a game apparatus 1 executing a color conversion program according to a first embodiment of the present invention.

With reference to the drawings, a color conversion apparatus executing a color conversion program according to a first embodiment of the present invention will be described. Although the color conversion program of the present invention is usable by executing it by any computer system capable of performing a display on a display device, a game apparatus 1 is used as an example of the color conversion apparatus, and the color conversion program is described using a color conversion program executed by the game apparatus 1. FIG. 1 is an external view of the game apparatus 1 executing the color conversion program of the present invention. Here, a hand-held game apparatus is shown as an example of the game apparatus 1. The game apparatus 1 includes a camera, and functions as an imaging apparatus to take an image with the camera, to display the taken image on a screen, and to store data of the taken image.

As shown in FIG. 1, the game apparatus 1 is a foldable hand-held game apparatus in an opened state. The game apparatus 1 is configured to have such a size as to be held by a user with both hands or one hand.

The game apparatus 1 includes a lower housing 11 and an upper housing 21. The lower housing 11 and the upper housing 21 are connected to each other so as to be capable of being opened or closed (foldable). In an example of FIG. 1, the lower housing 11 and the upper housing 21 are each formed in a plate-like shape of a horizontally long rectangle, and foldably connected to each other at long side portions thereof. Usually, the user uses the game apparatus 1 in the opened state. When not using the game apparatus 1, the user keeps the game apparatus 1 in a closed state. In the example shown in FIG. 1, in addition to the closed state and the opened state, the game apparatus 1 is capable of maintaining an angle between the lower housing 11 and the upper housing 21 at any angle ranging between the closed state and the opened state by frictional force generated at a connection portion, and the like. In other words, the upper housing 21 can be stationary at any angle with respect to the lower housing 11.

In the lower housing 11, a lower LCD (Liquid Crystal Display) 12 is provided. The lower LCD 12 has a horizontally long shape, and is located such that a long side direction thereof corresponds to a long side direction of the lower housing 11. It is noted that although an LCD is used as a display device provided in the game apparatus 1 in the present embodiment, any other display devices such as a display device using an EL (Electro Luminescence), and the like may be used. In addition, the game apparatus 1 can use a display device of any resolution. Although details will be described later, the lower LCD 12 is used mainly for displaying an image taken by a camera 23 or 25 in real time.

In the lower housing 11, operation buttons 14A to 14K and a touch panel 13 are provided as input devices. As shown in FIG. 1, among the operation buttons 14A to 14K, the direction input button 14A, the operation button 14B, the operation button 14C, the operation button 14 D the operation button 14E, the power button 14F, the start button 14G, and the select button 14H are provided on an inner main surface of the lower housing 11 which is located inside when the upper housing 21 and the lower housing 11 are folded. The direction input button 14A is used, for example, for a selection operation, and the like. The operation buttons 14B to 14E are used, for example, for a determination operation, a cancellation operation, and the like. The power button 14F is used for turning on or off the power of the game apparatus 1. In the example shown in FIG. 1, the direction input button 14A and the power button 14F are provided on the inner main surface of the lower housing 11 and on one of a left side and a right side (on the left side in FIG. 1) of the lower LCD 12 provided in the vicinity of a center of the inner main surface of the lower housing 11. Further, the operation buttons 14B to 14E, the start button 14G, and the select button 14H are provided on the inner main surface of the lower housing 11 and on the other of the left side and the right side (on the right side in FIG. 1) of the lower LCD 12. The direction input button 14A, the operation buttons 14B to 14E, the start button 14G, and the select button 14H are used for performing various operations with respect to the game apparatus 1.

It is noted that the operation buttons 14F to 14K are omitted in FIG. 1. For example, the L button 14I is provided at a left end of an upper surface of the lower housing 11, and the R button 14J is provided at a right end of the upper surface of the lower housing 11. The L button 14I and the R button 14J are used, for example, for performing a photographing instruction operation (a shutter operation) with respect to the game apparatus 1. In addition, the volume button 14K is provided on a left side surface of the lower housing 11. The volume button 14K is used for adjusting volume of speakers of the game apparatus 1.

The game apparatus 1 further includes the touch panel 13 as another input device in addition to the operation buttons 14A to 14K. The touch panel 13 is mounted so as to cover a screen of the lower LCD 12. In the present embodiment, the touch panel 13 is, for example, a resistive film type touch panel. However, the touch panel 13 is not limited to the resistive film type, but any press-type touch panel may be used. The touch panel 13 used in the present embodiment has the same resolution (detection accuracy) as that of the lower LCD 12. However, the resolution of the touch panel 13 and the lower LCD 12 may not necessarily be the same as each other. In the right side surface of the lower housing 11, an insertion opening (a dotted line shown in FIG. 1) is provided. The insertion opening is capable of accommodating a touch pen 27 which is used for performing an operation with respect to the touch panel 13. Although an input with respect to the touch panel 13 is usually performed using the touch pen 27, in addition to the touch pen 27, a finger of the user can be used for operating the touch panel 13.

In the right side surface of the lower housing 11, an insertion opening (indicated by a two-dot chain line in FIG. 1) is provided for accommodating a memory card 28. Inside the insertion opening, a connector (not shown) is provided for electrically connecting the game apparatus 1 to the memory card 28. The memory card 28 is, for example, an SD (Secure Digital) memory card, and detachably mounted to the connector. The memory card 28 is used, for example, for storing an image taken by the game apparatus 1, and loading an image generated by another apparatus into the game apparatus 1.

Further, in the upper surface of the lower housing 11, an insertion opening (indicated by a chain line in FIG. 1) is provided for accommodating a memory card 29. Inside the insertion opening, a connector (not shown) is provided for electrically connecting the game apparatus 1 to the memory card 29. The memory card 29 is a storage medium storing a color conversion program, a game program, and the like, and detachably mounted in the insertion opening provided in the lower housing 11.

Three LEDs 15A to 15C are mounted to a left side part of the connection portion where the lower housing 11 and the upper housing 21 are connected to each other. The game apparatus 1 is capable of performing wireless communication with another apparatus, and the first LED 15A is lit up while wireless communication is established. The second LED 15B is lit up while the game apparatus 1 is charged. The third LED 15C is lit up while the power of the game apparatus 1 is ON. Thus, by the three LEDs 15A to 15C, a state of communication establishment of the game apparatus 1, a state of charge of the game apparatus 1, and a state of ON/OFF of the power of the game apparatus 1 can be notified to the user.

Meanwhile, in the upper housing 21, an upper LCD 22 is provided. The upper LCD 22 has a horizontally long shape, and is located such that a long side direction thereof corresponds to a long side direction of the upper housing 21. Similarly as the lower LCD 12, a display device of another type having any resolution may be used instead of the upper LCD 22. A touch panel may be provided so as to cover the upper LCD 22. For example, the upper LCD 22 displays thereon an operation explanation screen for informing the user of roles of the operation buttons 14A to 14K and the touch panel 13.

In the upper housing 21, two cameras (the inner camera 23 and the outer camera 25) are provided. As shown in FIG. 1, the inner camera 23 is mounted in an inner main surface of the upper housing 21 and adjacent to the connection portion. On the other hand, the outer camera 25 is mounted in a surface opposite to the surface in which the inner camera 23 is mounted, namely, in an outer main surface of the upper housing 21 (which is a surface located on the outside of the game apparatus 1 in the closed state, and a back surface of the upper housing 21 shown in FIG. 1). In FIG. 1, the outer camera 25 is indicated by a dashed line. Thus, the inner camera 23 is capable of taking an image in a direction in which the inner main surface of the upper housing 21 faces, and the outer camera 25 is capable of taking an image in a direction opposite to an imaging direction of the inner camera 23, namely, in a direction in which the outer main surface of the upper housing 21 faces. In other words, in the present embodiment, the two cameras 23 and 25 are provided such that the imaging directions thereof are opposite to each other. For example, the user can take an image of a view seen from the game apparatus 1 toward the user with the inner camera 23 as well as an image of a view seen from the game apparatus 1 in a direction opposite to the user with the outer camera 25.

in the inner main surface and adjacent to the connection portion, a microphone (a microphone 43 shown in FIG. 10) as a voice input device is accommodated. In the inner main surface and adjacent to the connection portion, a microphone hole 16 is formed to allow the microphone 43 to detect sound outside the game apparatus 1. The accommodating position of the microphone 43 and the position of the microphone hole 16 are not necessarily in the connection portion. For example, the microphone 43 may be accommodated in the lower housing 11, and the microphone hole 16 may be provided in the lower housing 11 so as to correspond to the accommodating position of the microphone 43.

In the outer main surface of the upper housing 21, a fourth LED 26 (indicated by a dashed line in FIG. 1) is mounted. The fourth LED 26 is lit up at a time when photographing is performed with the inner camera 23 or the outer camera 25 (a shutter button is pressed). Further, the fourth LED 26 is lit up while a moving picture is taken by the inner camera 23 or the outer camera 25. By the fourth LED 26, it is notified to an object person whose image is taken and people around the object person that photographing is performed (being performed) by the game apparatus 1.

Sound holes 24 are formed in the inner main surface of the upper housing 21 and on each of left and right sides of the upper LCD 22 provided in the vicinity of a center of the inner main surface of the upper housing 21. The speakers are accommodated in the upper housing 21 and at the back of the sound holes 24. The sound holes 24 are holes for releasing sound from the speakers therethrough.

As described above, the inner camera 23 and the outer camera 25 which are configurations for taking an image, and the upper LCD 22 which is display means for displaying mainly the operation explanation screen are provided in the upper housing 21. On the other hand, the input devices for performing an operation input with respect to the game apparatus 1 (the touch panel 13 and the buttons 14A to 14I), and the lower LCD 12 which is display means for displaying a taken image are provided in the lower housing 11. Thus, when using the game apparatus 1, the user can hold the lower housing 11 and perform an input with respect to the input device while looking at a taken image (an image taken by the camera) displayed on the lower LCD 12.

Figure 2:
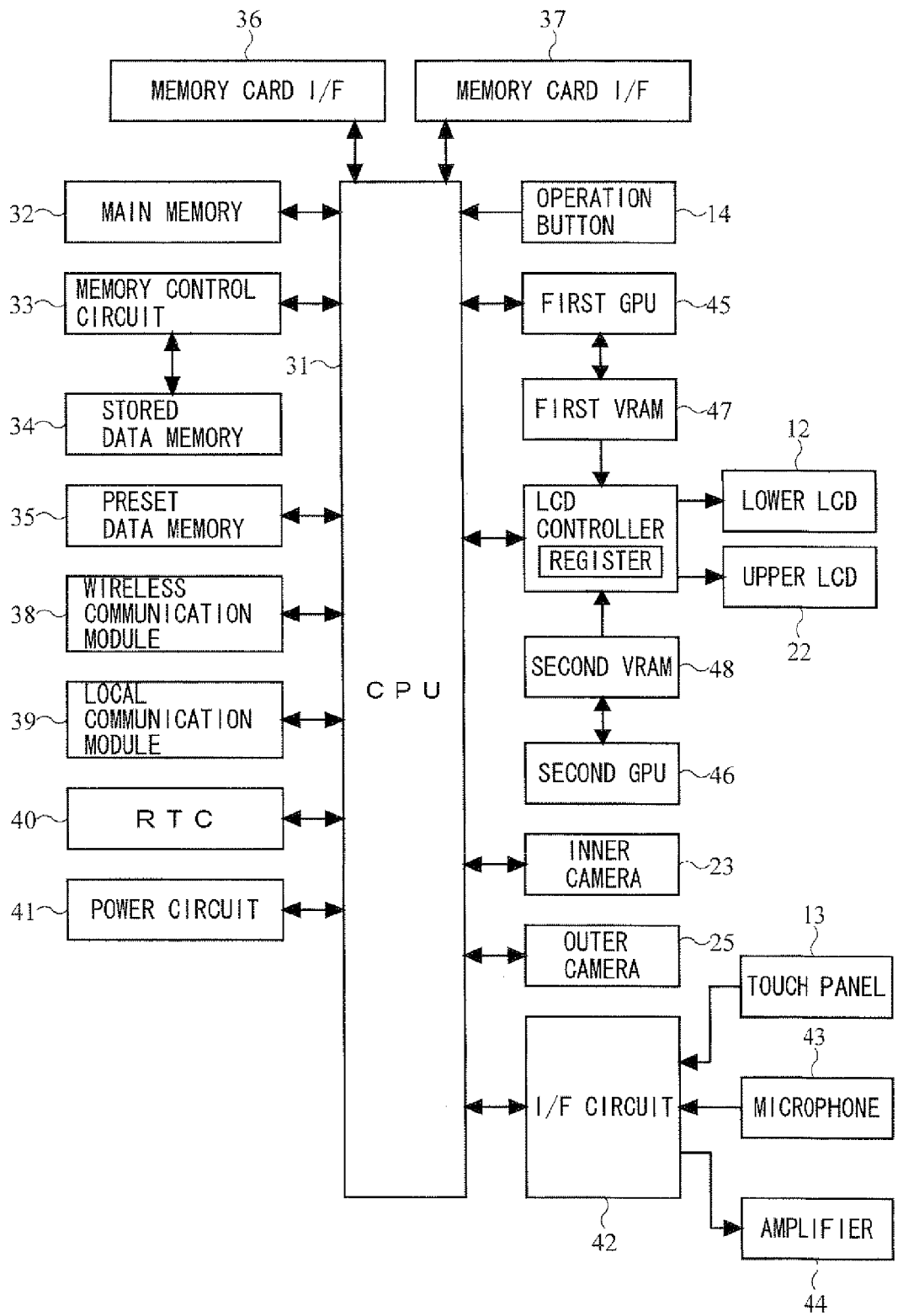
FIG. 2 is a block diagram showing an example of an internal configuration of the game apparatus 1 of FIG. 1.

The following will describe an internal configuration of the game apparatus 1 with reference to FIG. 2. FIG. 2 is a block diagram showing an example of the internal configuration of the game apparatus 1.

As shown in FIG. 2, the game apparatus 1 includes electronic components including a CPU 31, a main memory 32, a memory control circuit 33, a stored data memory 34, a preset data memory 35, a memory card interface (memory card I/F) 36, a memory card I/F 37, a wireless communication module 38, a local communication module 39, a real time clock (RTC) 40, a power circuit 41, an interface circuit (I/F circuit) 42, a first GPU (Graphic Processing Unit) 45, a second CPU 46, a first VRAM (Video RAM) 47, a second VRAM 48, an LCD controller 49, and the like. These electronic components are mounted on an electronic circuit substrate and accommodated in the lower housing 11 (or may be accommodated in the upper housing 21).

The CPU 31 is information processing means for executing a predetermined program. In the present embodiment, the predetermined program is stored in a memory (e.g. the stored data memory 34) within the game apparatus 1 or in the memory cards 28 and/or 29, and the CPU 31 executes later-described color conversion processing by executing the predetermined program. It is noted that the program executed by the CPU 31 may be stored in advance in a memory within the game apparatus 1, may be obtained from the memory cards 28 and/or 29, or may be obtained from another apparatus by means of communication with the other apparatus.

The main memory 32, the memory control circuit 33, and the preset data memory 35 are connected to the CPU 31. The stored data memory 34 is connected to the memory control circuit 33. The main memory 32 is storage means used as a work area and a buffer area of the CPU 31. In other words, the main memory 32 stores various data used in the color conversion processing, and also stores a program obtained from the outside (the memory cards 28 and 29, another apparatus, and the like). In the present embodiment, for example, a PSRAM (Pseudo-SRAM) is used as the main memory 32. The stored data memory 34 is storage means for storing the program executed by the CPU 31, data of images taken by the cameras 23 and 25, and the like. The stored data memory 34 is constructed of a nonvolatile storage means, for example, a NAND flash memory. The memory control circuit 33 is a circuit for controlling reading of data from the stored data memory 34 or writing of data to the stored data memory 34 in accordance with an instruction from the CPU 31. The preset data memory 35 is storage means for storing data (preset data) of various parameters which are set in advance in the game apparatus 1, and the like. A flash memory connected to the CPU 31 via an SPI (Serial Peripheral Interface) bus can be used as the preset data memory 35.

The memory card I/Fs 36 and 37 are connected to the CPU 31. The memory card I/F 36 reads data from the memory card 28 which is mounted to the connector or writes data to the memory card 28 in accordance with an instruction from the CPU 31. The memory card I/F 37 reads data from the memory card 29 which is mounted to the connector or writes data to the memory card 29 in accordance with an instruction from the CPU 31. In the present embodiment, data of images taken by the cameras 23 and 25 and image data received from another apparatus are written to the memory card 28, and image data stored in the memory card 28 is read from the memory card 28 to be stored in the stored data memory 34 or transmitted to the other apparatus. Various programs stored in the memory card 29 are read by the CPU 31 to be executed.

The color conversion program of the present invention may be supplied to a computer system via a wired or wireless communication line, in addition to from an external storage medium such as the memory card 29, and the like. The color conversion program may be stored in advance in a nonvolatile storage unit within the computer system. An information storage medium for storing the color conversion program is not limited to the above nonvolatile storage unit, but maybe a CD-ROM, a DVD, or an optical disc-shaped storage medium similar to them.

The wireless communication module 38 functions to connect to a wireless LAN device, for example, by a method conformed to the standard of IEEE802.11.b/g. The local communication module 39 functions to wirelessly communicate with a game apparatus of the same type by a predetermined communication method. The wireless communication module 38 and the local communication module 39 are connected to the CPU 31. The CPU 31 is capable of receiving data from and sending data to another apparatus via the Internet using the wireless communication module 38, and capable of receiving data from and sending data from another game apparatus of the same type using the local communication module 39.

The RTC 40 and the power circuit 41 are connected to the CPU 31. The RTC 40 counts a time, and outputs the time to the CPU 31. For example, the CPU 31 is capable of calculating a current time (date), and the like based on the time counted by the RTC 40. The power circuit 41 controls electric power from a power supply (typically, a battery accommodated in the lower housing 11) of the game apparatus 1 to supply the electric power to each electronic component of the game apparatus 1.

The game apparatus 1 includes the microphone 43 and an amplifier 44. The microphone 43 and the amplifier 44 are connected to the I/F circuit 42. The microphone 43 detects voice produced by the user toward the game apparatus 1, and outputs a voice signal indicative of the voice to the I/F circuit 42. The amplifier 44 amplifies the voice signal from the I/F circuit 42, and causes the speakers (not shown) to output the voice signal. The I/F circuit 42 is connected to the CPU 31.

The touch panel 13 is connected to the I/F circuit 42. The I/F circuit 42 includes a voice control circuit for controlling the microphone 43 and the amplifier 44 (the speakers), and a touch panel control circuit for controlling the touch panel 13. The voice control circuit performs A/D conversion or D/A conversion with respect to the voice signal, and converts the voice signal into voice data in a predetermined format. The touch panel control circuit generates touch position data in a predetermined format based on a signal from the touch panel 13, and outputs the touch position data to the CPU 31. For example, the touch position data is data indicative of coordinates of a position at which an input is performed with respect to an input surface of the touch panel 13. The touch panel control circuit reads a signal from the touch panel 13 and generates touch position data every a predetermined time period. The CPU 31 is capable of recognizing a position at which an input is performed with respect to the touch panel 13 by obtaining the touch position data via the I/F circuit 42.

An operation section 14 includes the above operation buttons 14A to 14K, and is connected to the CPU 31. The operation section 14 outputs operation data indicative of an input state with respect to each of the buttons 14A to 14I (whether or not each button is pressed) to the CPU 31. The CPU 31 obtains the operation data from the operation section 14, and executes processing in accordance with an input with respect to the operation section 14.

The cameras 23 and 25 are connected to the CPU 31. Each of the inner camera 23 and the outer camera 25 takes an image in accordance with an instruction from the CPU 31, and outputs data of the taken image to the CPU 31. In the present embodiment, the CPU 31 gives an imaging instruction to the camera 23 or 25, and the camera which has received the imaging instruction takes an image and sends image data to the CPU 31.

The first VRAM 47 is connected to the first GPU 45, and the second VRAM 48 is connected to the second GPU 46. The first GPU 45 generates a first display image in accordance with an instruction from the CPU 31 and based on data, for generating a display image, which is stored in the main memory 32, and draws the first display image in the first VRAM 47. The second GPU 46 similarly generates a second display image in accordance with an instruction from the CPU 31, and draws the second display image in the second VRAM 48. The first VRAM 47 and the second VRAM 48 are connected to the LCD controller 49.

The LCD controller 49 includes a register 491. The register 491 stores a value of 0 or 1 in accordance with an instruction from the CPU 31. When the value of the register 491 is 0, the LCD controller 49 outputs the first display image drawn in the first VRAM 47 to the lower LCD 12, and outputs the second display image drawn in the second VRAM 48 to the upper LCD 22. When the value of the register 491 is 1, the LCD controller 49 outputs the first display image drawn in the first VRAM 47 to the upper LCD 22, and outputs the second display image drawn in the second VRAM 48 to the lower LCD 12. In the present embodiment, the CPU 31 causes a taken image obtained from the inner camera 23 or the inner camera 25 to be displayed on the lower LCD 12, and an operation explanation screen generated by predetermined processing to be displayed on the upper LCD 22.

For example, on the upper LCD 22, a photographing instruction button explanation image, a camera change button explanation image, a zoom instruction button explanation image, a display image selection button explanation image, and the like are displayed as the above operation explanation image. The photographing instruction button explanation image is an image indicating a position of the operation button 14 for performing a photographing instruction. The camera change button explanation image is an image indicating a position of the operation button 14 for performing a camera change instruction. The camera change instruction is an instruction to change a camera for taking an image between the inner camera 23 and the outer camera 25. The zoom instruction button explanation image is an image indicating a position of the operation button 14 for performing a zoom change instruction. The zoom change instruction is an instruction to zoom in/out a taken image displayed on the lower LCD 12. The display image selection button explanation image is an image indicating a position of the operation button 14 for performing a display change instruction. The display change instruction is an instruction to select a stored image to be displayed on the lower LCD 12 in the case of displaying a stored image stored in the game apparatus 1 on the lower LCD 12.

Figure 3:
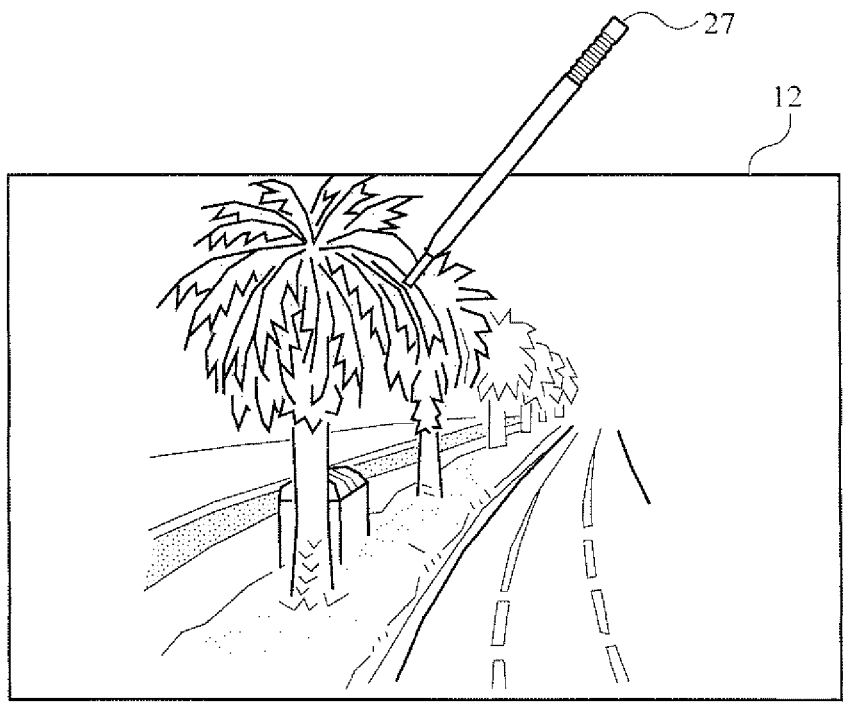
FIG. 3 is a view showing an example of a screen display which is displayed on a lower LCD 12 of FIG. 1 and color-converted.
Figure 3:
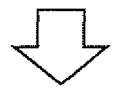
Figure 3:
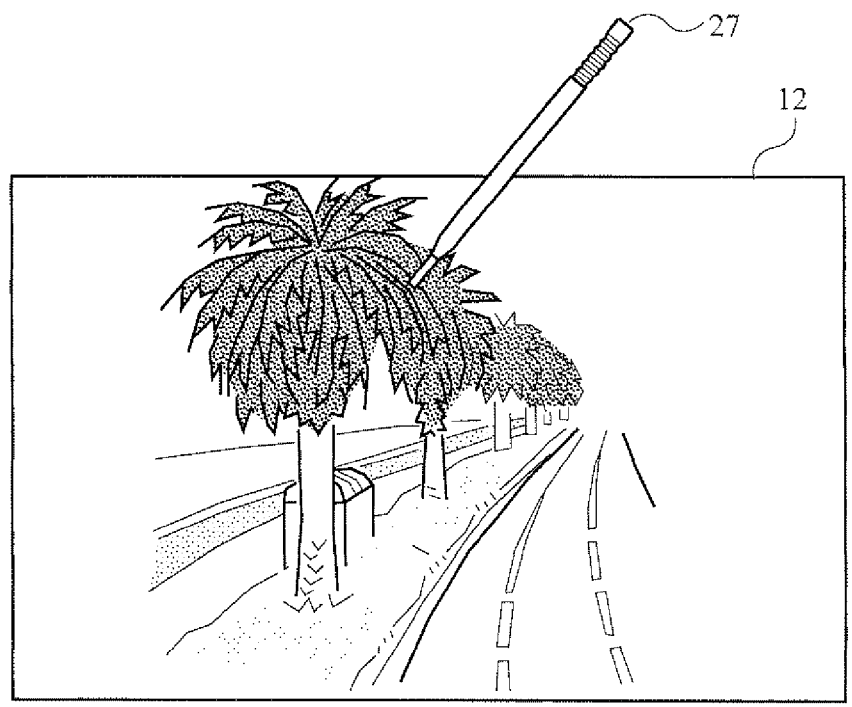
Figure 5:
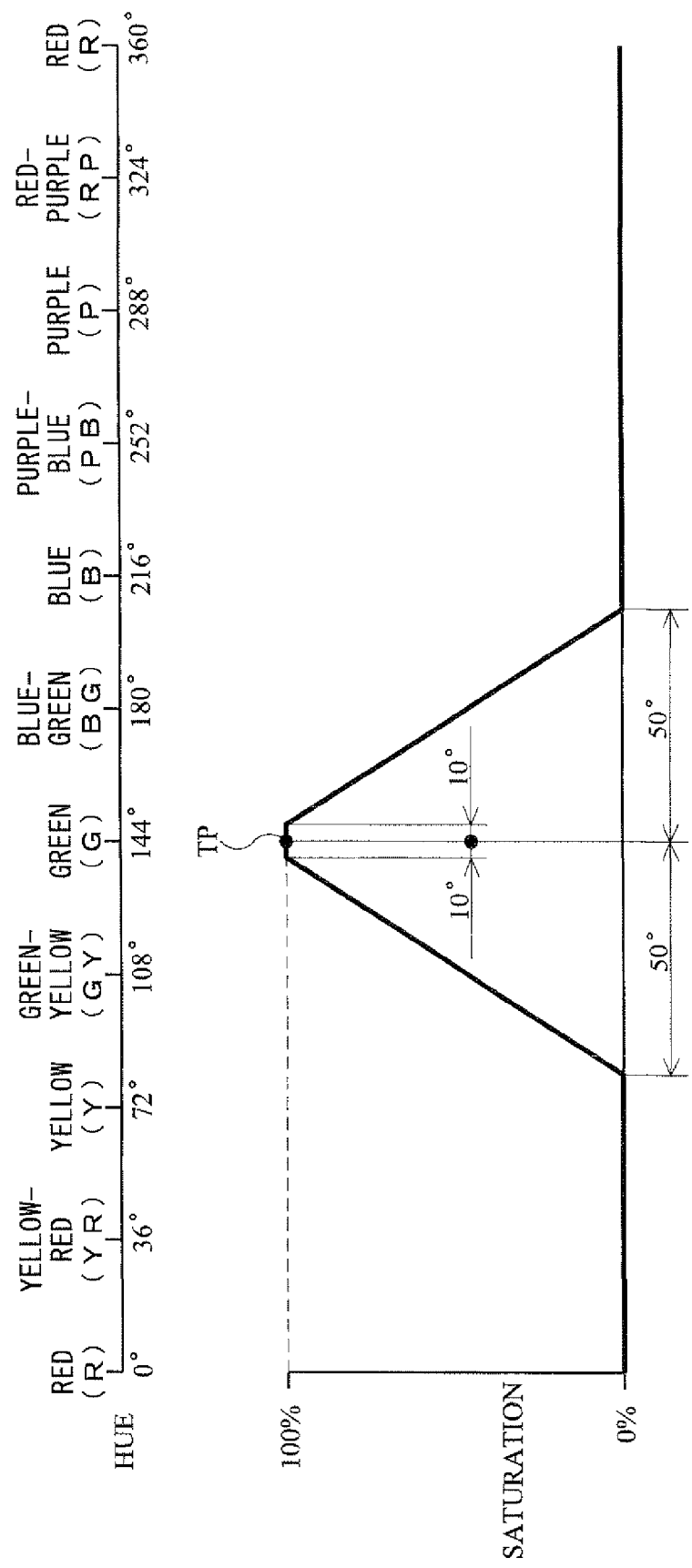
FIG. 5 is a view showing an example of a hue range determined as a conversion target with respect to a touch position TP, and an example of changing saturation with respect to the conversion target in the first embodiment of the present invention.
Figure 6:
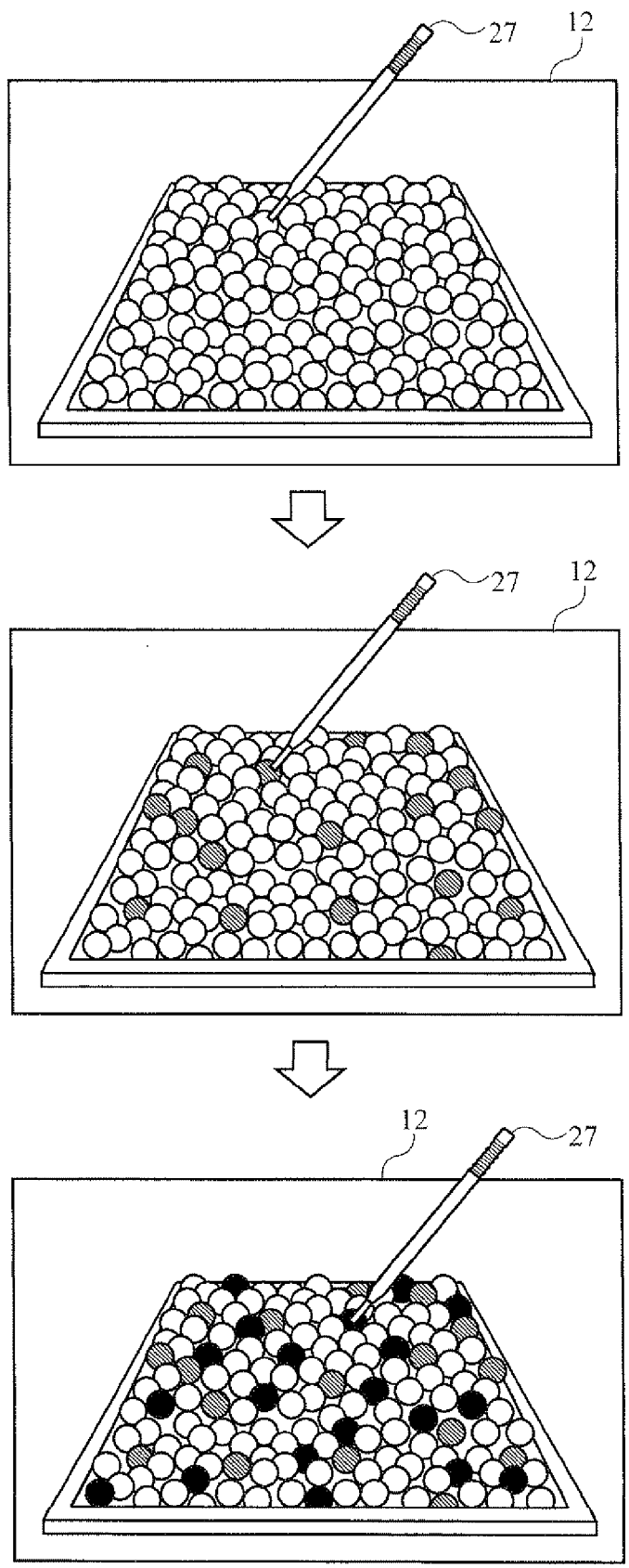
FIG. 6 is a view showing another example of the screen display which is displayed on the lower LCD 12 of FIG. 1 and color-converted.
Figure 7:
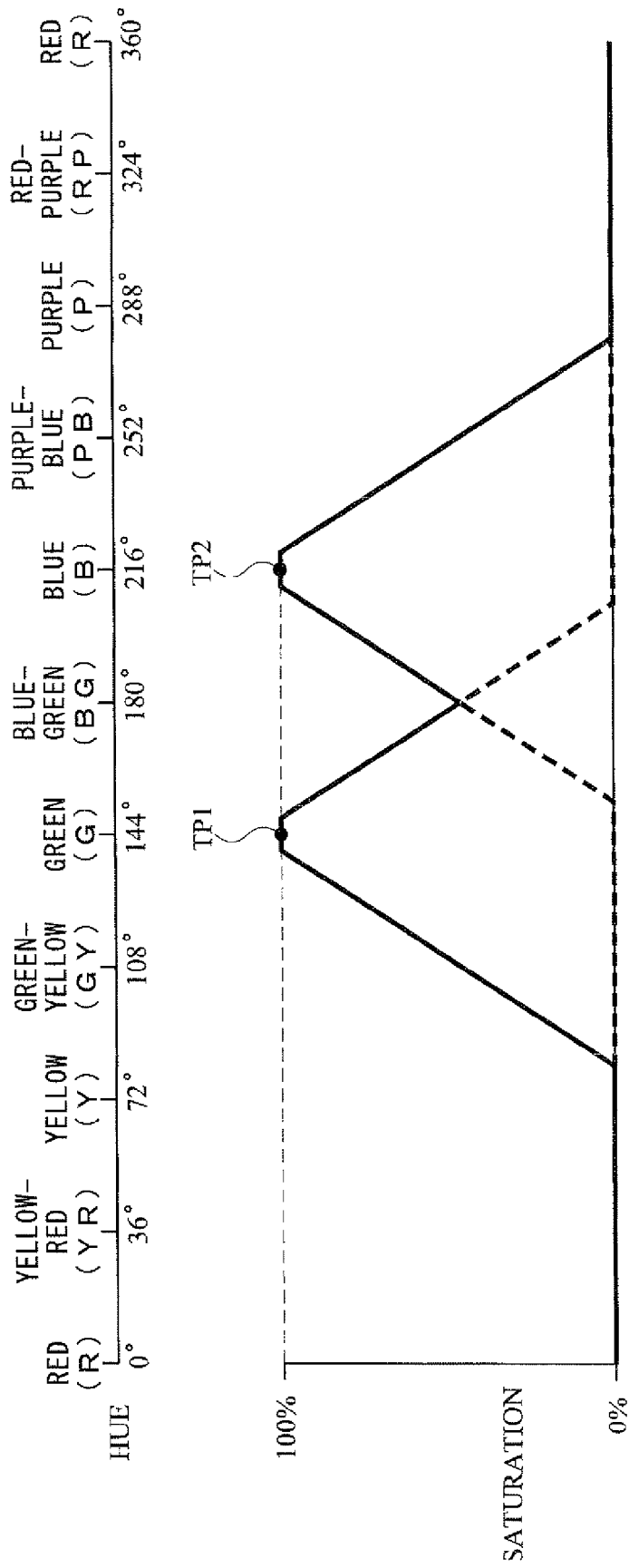
FIG. 7 is a view showing an example of hue ranges determined as conversion targets with respect to a plurality of touch positions TP1 and TP2, and an example of changing saturation with respect to the conversion targets in the first embodiment of the present invention.

Prior to description of a concrete processing operation by the color conversion program executed by the game apparatus 1, with reference to FIGS. 3 to 7, the following will describe an example of a display form displayed on the lower LCD 12 and/or the upper LCD 22 by the processing operation. FIG. 3 is a view showing an example of a screen display which is displayed on the lower LCD 12 and color-converted. FIG. 4 is a view showing an example of a hue circle used in the color conversion program. FIG. 5 is a view showing an example of a hue range determined as a conversion target with respect to a touch position TP and an example of changing saturation (chroma) with respect to the conversion target. FIG. 6 is a view showing another example of the screen display which is displayed on the lower LCD 12 and color-converted. FIG. 7 is a view showing an example of hue ranges determined as conversion targets with respect to a plurality of touch positions TP1 and TP2 and an example of changing saturation with respect to the conversion targets.

As shown in FIG. 3, a real-time image (a taken image) taken by the inner camera 23 or the outer camera 25 is displayed on the lower LCD 12 of the game apparatus 1. In the present embodiment, the taken image is an original image before later-described color conversion processing, that is, a chromatic image, but a display image obtained by changing the taken image into a monochrome image (namely, an achromatic image obtained by changing saturation of all pixels of the taken image into 0) is displayed once on the lower LCD 12 (an upper diagram in FIG. 3). Then, saturation of the display image is changed in accordance with a hue of a pixel of the taken image (i.e. a pixel of the original image, not the image being displayed) corresponding to a touch position at which a touch operation is performed with respect to the touch panel 13, and an after-color-conversion image is displayed on the lower LCD 12 (a lower diagram in FIG. 3).

The upper diagram in FIG. 3 shows an example in which a monochrome image obtained by changing saturation of each pixel of the taken image (original image), which is the chromatic image, to 0 is displayed on the lower LCD 12. In the present embodiment, by performing a touch operation at a position on the monochrome image displayed on the lower LCD 12, color is added to only pixels having hues in the vicinity of a hue which is the same as a hue of the taken image corresponding to the position, and an resultant image is displayed on the lower LCD 12. For example, in the upper diagram in FIG. 3, in the monochrome image disclosed on the lower LCD 12, the user performs a touch operation at a position at which green is originally expressed in the original image. The lower diagram in FIG. 3 shows a state in which a display image obtained by adding originally expressed green to only portions of the monochrome image at which green is originally expressed in imaging (portions of leaves of trees in the lower diagram in FIG. 3) in accordance with the touch operation.

More specifically, when the user performs a touch operation with respect to the monochrome image displayed on the lower LCD 12, a color (e.g. an RGB value) of a pixel of the taken image (original image), from which the monochrome image is generated, corresponding to a position at which the touch operation is performed is detected. In other words, an RGB value in the display image being displayed in the lower LCD 12 is not obtained, but the color in the original image (taken image) before color conversion is obtained. Then, a hue corresponding to the detected color of the pixel is calculated, and a predetermined range having the hue at a center thereof is set as a color conversion target. Saturation for the hue which is the color conversion target is changed to a value larger than 0. Thus, pixels having the hue which is the color conversion target is changed from a monochromatic color to a chromatic color, and an after-color-conversion image in which color is added naturally such that a color at the position at which the user performs the touch operation is changed to an originally expressed color is displayed on the lower LCD 12.

In calculating the hue corresponding to the detected color of the pixel and setting the predetermined range having the hue at the center thereof, for example, a hue circle is used as shown in FIG. 4. FIG. 4 shows an example of using the Munsell hue circle. The Munsell hue circle divides into five principal hues (red, yellow, green, blue, purple) and intermediate hues halfway between the adjacent principal colors (yellow-red, green-yellow, blue-green, purple-blue, red-purple), namely, a total of 10 hues, further divides between these hues, and arranges these hues in a circle. For example, in the present embodiment, for the hue (e.g. green) corresponding the detected color of the pixel, a predetermined angular range (e.g. 50 degrees before and after the hue) having the hue at a center thereof in the Munsell hue circle is set as a color conversion target.

In the Munsell hue circle, hue dividing intervals are equal to each other. Thus, even a selected hue is either color, it is easy to set a range having the hue at a center thereof. However, if such an effect is not expected, another hue circle may be used. For example, another color system, such as a PCCS (Practical Color Co-ordinate System), an Ostwald color system, an NCS (Natural Color System), an XYZ color system, or the like, may be used. In the present invention, various color systems using at least hue as an attribute for expressing color can be used.

With reference to FIG. 5, the following will describe an example of changing saturation with respect to the set color conversion target. FIG. 5 shows an example of the color conversion target which is set using the above Munsell hue circle, and an example of changing saturation with respect to the color conversion target.

For example, it is assumed that the hue of the pixel of the taken image corresponding to the touch position TP by the user is green. In this case, a color conversion range is set so as to have a hue "green" at a center thereof and so as to have 50 degrees before and after the hue "green" in the Munsell hue circle (namely, a range of a total of 100 degrees). The set color conversion range is divided into a range in which a rate of returning saturation to original saturation (hereinafter, referred to as a saturation reproduction rate) is 100% and a range in which the saturation reproduction rate is changed so as to be gradually decreased from 100% to 0%. The saturation reproduction rate is a rate of saturation of a monochromatic display image with respect to saturation of an original image (namely, a chromatic taken image), and saturation which is larger than saturation of the original image is not set. In other words, a saturation reproduction rate of 100% in color conversion means to change saturation of pixels of the color conversion target which are set to 0 in the monochromatic display image to saturation of the pixels in the original image to display a resultant image. Changing saturation at a saturation reproduction rate of 50% in color conversion means to change the saturation of the pixels of the color conversion target to half (50%) of the saturation of the pixels in the original image to display a resultant image. For example, when a hue corresponding to a touch position TP is "green", a range between 5 degrees before and after the hue in the Munsell hue circle (namely, a range of a total of 10 degrees) is set to a range in which the saturation reproduction rate is 100%. Further, when the hue corresponding to the touch position TP is "green", ranges from 5 to 50 degrees before and after the hue in the hue are set to ranges in which the saturation reproduction rate is changed so as to be gradually decreased from 100% to 0%. In other words, saturation with respect to the range between 5 degrees before and after the detected hue corresponding to the touch position TP is changed at a saturation reproduction rate of 100%, and the saturation reproduction rate is gradually decreased as the hue is distance therefrom. More specifically, as shown in FIG. 5, from a hue 5 degrees away from the selected hue to a hue 50 degrees away from the selected hue in the Munsell hue circle, the saturation is set so as to be linearly changed at a saturation reproduction rate of 100% to 0%.

As described above, by gradually decreasing the saturation, it is possible to express an image such that a color originally obtained in imaging is added naturally to the monochrome image. Further, the user can easily generate an image in which a desired color is added only by performing a touch operation at one position with respect to the display image displayed on the lower LCD 12. Further, the hue which is selected in accordance with the touch operation is set at a center, and the saturation is set so as to be decreased in a phased manner. Thus, noise can be reduced in performing color conversion, and it is possible to convert into an image in which the color at the position at which the touch operation is performed is naturally added.

With reference to FIGS. 6 and 7, an example when the user performs a touch operation at a plurality of positions with respect to the monochrome image displayed on the lower LCD 12 is described.

An upper diagram in FIG. 6 shows another example in which a monochrome image obtained by changing saturation of each pixel of the taken image, which is the chromatic image, to 0 is displayed on the lower LCD 12. More specifically, in the upper diagram in FIG. 6, an image of color balls of various colors is taken, and a monochrome image generated from the taken image is displayed on the lower LCD 12. For example, in the upper diagram in FIG. 6, in the monochrome image displayed on the lower LCD 12, the user performs a touch operation with respect to a color ball whose image is taken originally in green. A middle diagram in FIG. 6 shows a state in which an after-color-conversion image which is obtained by adding originally expressed green only to portions (color balls of green which are indicated by slant line regions in the middle diagram in FIG. 6) of the monochrome image whose images are originally taken in green is displayed on the lower LCD 12 in accordance with the touch operation.

Further, in a lower diagram in FIG. 6, in a display image obtained by adding color only to pixels of the monochrome image displayed on the lower LCD 12 which have hues in the vicinity of green which is originally obtained in imaging, the user further performs a touch operation with respect to a color ball whose image is taken originally in blue. The lower diagram in FIG. 6 shows a state in which a display image obtained by adding originally expressed blue to portions (color balls of blue which are indicated by filled regions in the lower diagram in FIG. 6) whose images are originally taken in blue, in addition to the portions of the monochrome image whose images are taken originally in green, is displayed on the lower LCD 12 in accordance with the touch operation. Thus, when the user performs a touch operation at a plurality of positions with respect to the monochrome image displayed on the lower LCD 12, color is added to pixels having a hue (green and blue in the example in FIG. 6) in the vicinity of a hue which is the same as a hue of the taken image corresponding to each touch position, and an after-color-conversion image is displayed on the lower LCD 12. Thus, the user can easily generate an image in which a plurality of colors are added in accordance with the touch operation only by performing a touch operation at a plurality of positions with respect to the display image displayed on the lower LCD 12.

More specifically, as shown in FIG. 7, it is assumed that a hue of a pixel of the taken image corresponding to a first touch position TP1 by the user is green. In this case, a first color conversion range is set so as to have the hue "green" at a center thereof similarly as in FIG. 5 and so as to have 50 degrees before and after the hue "green" in the Munsell hue circle. Further, a saturation reproduction rate for the first color conversion range is the same as that in the example described with reference to FIG. 5, and thus the detail description thereof will be omitted.

Next, it is assumed that a hue of a pixel of the taken image corresponding to a second touch position TP2 of the user is blue. In this case, a second color conversion range is set so as to have a hue "blue" at a center thereof similarly as the first color conversion range and so as to have 50 degrees before and after the hue "blue" in the Munsell hue circle. The set second color conversion range is divided into a region in which saturation is changed at a saturation reproduction rate of 100% and a region in which saturation is changed so as to be gradually decreased at a saturation reproduction rate changed of 100% to 0%. In other words, when the hue corresponding to the touch position TP2 is "blue", a range between 5 degrees before and after the hue in the Munsell hue circle are set to a range in which saturation is changed at a saturation reproduction rate of 100%, and ranges from 5 to 50 degrees before and after the hue are set to ranges in which saturation is changed so as to be gradually decreased at a saturation reproduction rate of 100% to 0%.

Here, as shown in FIG. 7, where a hue "red" in the Munsell hue circle is set at a circular angular position of 0 degree, the hue "green" is set at a circular angular position of 144 degrees, and the hue "blue" is set at a circular angular position of 216 degrees. In other words, as shown in FIG. 7, the first color conversion range set for the hue "green" partially overlaps with the second color conversion range set for the hue "blue". In this case, in a range where the color conversion ranges overlaps with each other, a higher saturation reproduction rate is selected among saturation reproduction rates set for the color conversion ranges (see FIG. 7). Thus, by combining saturation reproduction rates set for a plurality of color conversion ranges, the saturation reproduction rates are smoothly connected in a range where the plurality of color conversion ranges overlap with each other, thereby enabling color conversion processing to be performed without an uncomfortable feeling.

Figure 9:
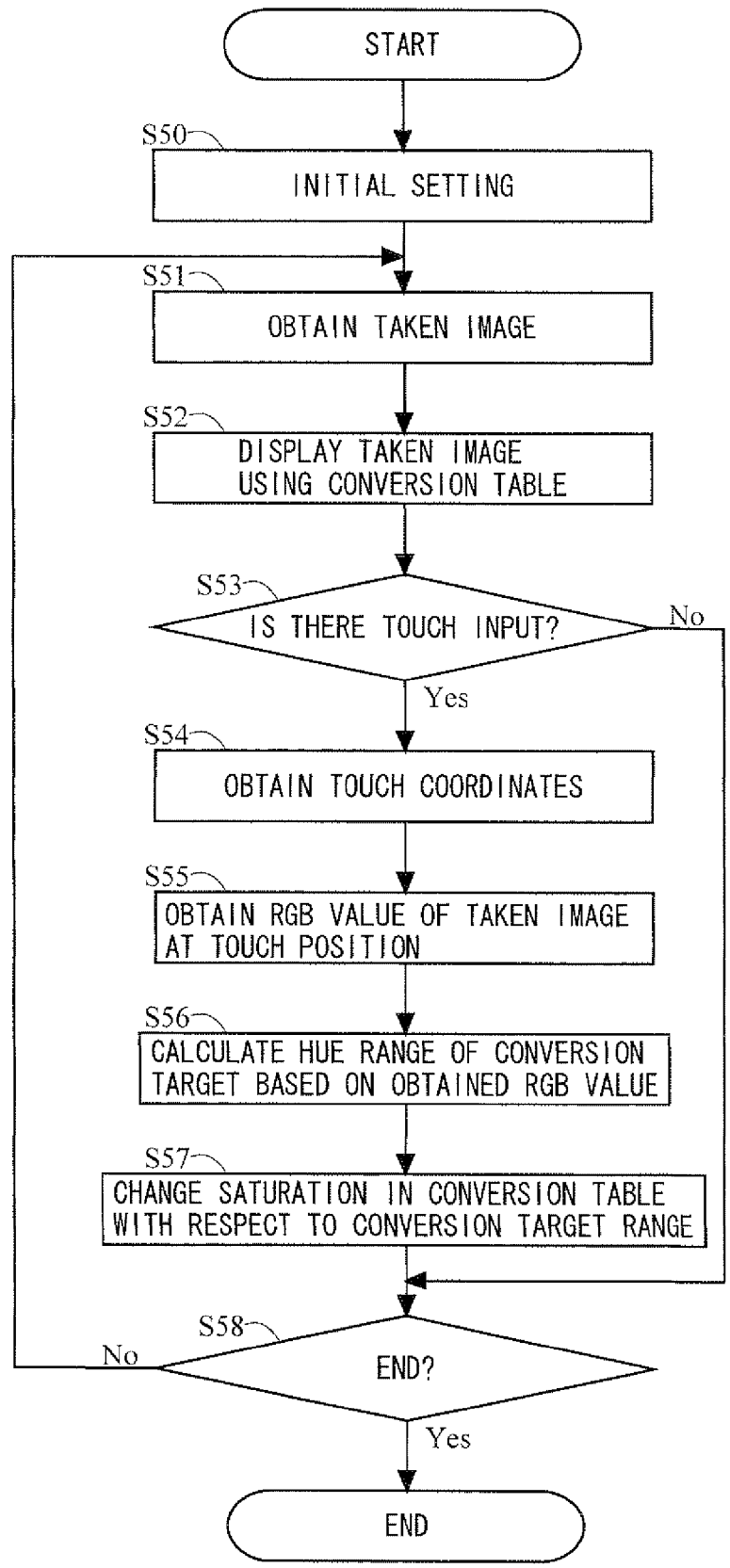
FIG. 9 is a flow chart of color conversion processing executed by the game apparatus 1 executing the color conversion program according to the first and second embodiments of the present invention.

With reference to FIGS. 8 and 9, the following will describe a concrete processing operation by the color conversion program executed by the game apparatus 1. FIG. 8 is a view showing an example of various data stored in the main memory 32 in accordance with execution of the color conversion program. FIG. 9 is a flow chart of the color conversion processing executed by the game apparatus 1 executing the color conversion program. A program for executing these processing is included in a program stored in the memory card 28 or the memory card 29, and read out from the memory card 28 via the memory card I/F 36 or from the memory card 29 via the memory card I/F 37 into the main memory 32 to be executed by the CPU 31 when the power of the game apparatus 1 is turned on.

As shown in FIG. 8, programs read out from the memory card 28 and the memory card 29, and temporal data generated in the color conversion processing are stored in the main memory 32. As shown in FIG. 8, in a data storage region of the main memory 32, touch coordinate data Da, taken image data Db, taken image RGB data Dc, touch position RGB data Dd, conversion target hue data De, conversion table data Df, display image data Dg, and the like are stored.

In the touch coordinate data Da, data of touch coordinates indicative of a touch position TP in a screen coordinate system at which a player touches the touch panel 13 is stored. For example, touch coordinates are obtained at intervals of a time unit at which the game apparatus 1 performs a game process (e.g. every 1/60 sec.), and accordingly, data indicative of the touch coordinates is stored in the touch coordinate data Da for updating the touch coordinate data Da.

In the taken image data Db, data of a real-time image taken by the inner camera 23 or the outer camera 25 is stored. For example, an image is taken by the inner camera 23 or the outer camera 25 at intervals of a predetermined time unit (e.g. every 1/60 sec.), and accordingly, data of the taken image is stored in the taken image data Db for updating the taken image data Db. In the taken image RGB data Dc, data indicative of an RGB value of each pixel of the image taken by the inner camera 23 or the outer camera 25 is stored.

In the touch position RGB data Dd, data indicative of an RGB data of a pixel of the taken image corresponding to a touch position TP is stored. For example, in accordance with a touch position TP at which a touch-on is performed with respect to the touch panel 13, a pointed position which is designated in a display image displayed on the lower LCD 12 (e.g. a position to which the touch position TP is perspectively projected in the display image) is calculated. Then, a pixel corresponding to the calculated pointed position is extracted, and data indicative of an RGB value of the pixel is stored in the touch position RGB data Dd.

In the conversion target hue data De, data indicative of the aforementioned color conversion range is stored. For example, a hue corresponding to the RGB value at the touch position TP which is stored in the touch position RGB data Dd is calculated, and data indicative of a predetermined range (a color conversion range) having the hue at a center thereof is stored in the conversion target hue data De.

In the conversion table data Df, data indicative of a conversion table used in converting an image taken by the inner camera 23 or the outer camera 25 into a display image to be displayed on the lower LCD 12 is stored. For example, in the conversion table, data indicative of a color which corresponds to an RGB value and is to be displayed on the lower LCD 12 is stored. More specifically, a hue, brightness (value), and saturation which correspond to each RGB value are described in the conversion table, and an RGB value of each pixel of the taken image is converted into a color described in the conversion table to generate a display image. In the display image data Dg, data indicative of an after-conversion image which is obtained by conversion with the conversion table is stored.

With reference to FIG. 9, the following will describe an operation of the game apparatus 1. When the power (the power button 14F) of the game apparatus 1 is turned on, a boot program (not shown) is executed by the CPU 31 to load the color conversion program stored in the memory card 28 or 29 into the main memory 32. By the CPU 31 executing the loaded color conversion program, steps shown in FIG. 9 (abbreviated as "S" in FIG. 9) are executed. A processing loop of steps 51 to 58 shown in FIG. 9 is executed every a predetermined time period (e.g. every 1/60 sec.).

As shown in FIG. 9, the CPU 31 performs initial setting for the color conversion processing (a step 50), and advances the processing to the next step. For example, as the initial setting executed at the step 50, the CPU 31 initializes each of parameters stored in the main memory 32 to a predetermined value. For example, the conversion table stored in the conversion table data Df is initialized to a table in which a color for each RGB value is converted into a color having a saturation value of 0 (namely, an achromatic color).

Next, the CPU 31 obtains data of a real-time image taken by the inner camera 23 or the outer camera 25 (the step 51), and advances the processing to the next step. For example, at the step 51, a chromatic image is taken in real time by one of the inner camera 23 and the outer camera 25, and the taken image data Db and the taken image RGB data Dc are updated with data indicative of an RGB value of each pixel of the taken image, and the like. In the processing thereafter, the taken image obtained at the above step 51 is used as an original image for the color conversion processing.

Next, the CPU 31 converts a color of each pixel of the taken image (original image) with the conversion table to display an after-conversion image on the lower LCD 12 (the step 52), and advances the processing to the next step. For example, the CPU 31 converts the RGB value of each pixel of the taken image which is stored in the taken image RGB data Dc into a color stored in the conversion table data Df with the conversion table to generate an after-conversion image, and updates the display image data Dg with the after-conversion image. Then, the CPU 31 displays the after-conversion image which is stored in the display image data Dg on the lower LCD 12. Specifically, the GPU (e.g. the first GPU 45) generates a display image in accordance with an instruction from the CPU 31 and based on the after-conversion image data which is stored in the display image data Dg, and draws the display image in the VRAM (e.g. the first VRAM 47). Then, the LCD controller 49 outputs the display image drawn in the VRAM (e.g. the first VRAM 47) to the lower LCD 12 to display the display image on the lower LCD 12. For example, when the conversion table stored in the conversion table data Df is in an initial state (namely, in a set state in which a color for each RGB value is converted into a color having a saturation value of 0, the chromatic taken image is converted into an achromatic (monochrome) display image, and an after-conversion image is displayed on the lower LCD 12.

In the display control processing described above, data which is generated to be displayed on the lower LCD 12 and indicative of an after-conversion image is stored once in the main memory 32 (display image data Dg), but the generated after-conversion image may be drawn directly in the VRAM (e.g. the first VRAM 47). In this case, the CPU 31 controls the GPU (e.g. the first GPU 45) to convert the RGB value of each pixel of the taken image, which is stored in the taken image RGB data Dc, into a color and to generate an after-conversion image, and draws the after-conversion image in the VRAM (e.g. the first VRAM 47).

Next, the CPU 31 determines whether or not a touch input has been performed with respect to the touch panel 13 (the step 53). When the touch input has been performed, the CPU 31 advances the processing to the next step 54. On the other hand, when the touch input has not been performed, the CPU 31 advances the processing to the step 58.

At the step 54, the CPU 31 obtains touch coordinates indicative of a touch position TP in the screen coordinate system at which the touch panel 13 has been touched, and advances the processing to the next step. For example, the CPU 31 updates the touch coordinates stored in the touch coordinate data Da with the obtained touch coordinates.

Next, the CPU 31 obtains an RGB value of the taken image (original image) corresponding to the touch position TP obtained at the step 54 (the step 55), and advances the processing to the next step. For example, the CPU 31 calculates a pointed position which is designated in the display image displayed on the lower LCD 12 (e.g. a position to which the touch position TP is perspectively projected in the display image) in accordance with the touch position TP. Then, the CPU 31 refers to the taken image RGB data Dc, extracts a pixel of the taken image corresponding to the calculated pointed position, and updates the touch position RGB data Dd with data indicative of the RGB value of the pixel. Here, the CPU 31 obtains the RGB value of the taken image at the above step 55. In other words, the CPU 31 obtains the RGB value of the original image (taken image) before color conversion, not an RGB value of the display image being displayed on the lower LCD 12.

Next, the CPU 31 calculates a conversion target range based on the RGB value obtained at the step 55 (the step 56), and advances the processing to the next step. For example, the CPU 31 converts the RGB value obtained at the step 55 into a hue, and calculates a predetermined circular angular range having the hue at a center thereof in the Munsell hue circle (see FIG. 4) as a conversion target range (see FIGS. 5 and 7). Then, the CPU 31 updates the conversion target hue data De with the calculated conversion target range.

Next, the CPU 31 changes saturation in the conversion table with respect to the conversion target range calculated at the step 56 (the step 57), and advances the processing to the next step. For example, the CPU 31 sets a range between 5 degrees before and after the hue at the center of the conversion target range to a range in which saturation is changed at a saturation reproduction rate of 100%, and sets ranges from 5 to 50 degrees before and after the hue to ranges in which saturation is changed so as to be gradually decreased at a saturation reproduction rate of 100% to 0% (see FIG. 5). Then, the CPU 31 sets a range in the conversion table in which hues within the conversion target range are described as a target whose saturation is to be changed, and changes saturation of colors described in the conversion table at the saturation reproduction rates according to the described hues to update the conversion table data Df.

When the step 57 is executed a plurality times for different hues, in a state where the saturation which is changed the last time is valid, the saturation is changed and written in the conversion table for each of hues which newly become change targets. Thus, a region in the conversion table in which saturation is set to a value other than 0 is increased every time the processing is performed. Further, when a hue which is a change target is a hue for which saturation of a color has been set to a value other than 0 (namely, a chromatic color), the CPU 31 selects a higher saturation reproduction rate, and changes the saturation for the hue at the selected saturation reproduction rate (see FIG. 7). As described above, by the processing at the step 57, the conversion table is updated with a conversion table in which saturation for the predetermined range having at the center thereof the hue corresponding to the position at which the touch operation is performed is changed to saturation larger than 0 to have a chromatic color. Then, by executing the step 52 after the update of the conversion table, an after-conversion image in which hues within the predetermined range having at the center thereof the hue corresponding to the position at which the touch operation is performed are added is displayed on the lower LCD 12.

Next, the CPU 31 determines whether or not to terminate the color conversion processing (the step 58). A condition for terminating the color conversion processing includes, for example, satisfaction of conditions to terminate the color conversion processing, an operation performed by the user for terminating the color conversion processing, and the like. When not terminating the color conversion processing, the CPU 31 returns to the step 51, and repeats the processing. When terminating the color conversion processing, the CPU 31 terminates the processing by the flow chart.

As described above, the game apparatus 1 according to the present embodiment is capable of performing color conversion desired by the user only by the user once touching an image displayed on the lower LCD 12 at a position at which a color desired by the user is originally expressed. Further, when a color conversion target is limited only to a hue of a pixel overlapping with a position at which a touch operation is performed and color conversion is performed, it is considered that a significantly limited region (in an extreme case, only a pixel overlapping with a touch position) is color-converted in a display image, and color conversion desired by the user cannot be performed. On the other hand, it is rare that the user desires to color-convert only a hue at a position at which a touch operation is performed, and generally, the user desires hues adjacent to the hue to some extent to be color conversion targets. The game apparatus 1 according to the present embodiment sets not only a hue according to the touch operation but also hues within a predetermined range having the hue at a center thereof as a range of a color conversion target. Thus, by setting the hues within the predetermined range as color conversion targets, hues slightly away from a hue of a pixel overlapping with the touch position can be color conversion targets, thereby enabling color conversion desired by the user to be performed.

In the above description, as shown in FIG. 5, from a hue 5 degrees away from the hue which is selected in accordance with the touch position TP to a hue 50 degrees away from the hue in the Munsell hue circle, saturation is set so as to be decreased from 100% to 0% at a linear rate. However, in this range, saturation may be decreased from 100% to 0% in another manner. For example, from the hue 5 degrees away from the hue which is selected in accordance with the touch position TP to the hue 50 degrees away from the hue in the Munsell hue circle, the saturation may be set so as to be decreased from 100% to 0% at a curved rate using a quadratic function curve, a cubic function curve, a sine curve, a cosine curve, a spline interpolation, or the like. As described above, by setting the saturation so as to be gradually decreased in a linear or curved manner with the hue which is selected in accordance with the touch operation set at a center, noise can be reduced in performing color conversion, and it is possible to convert into an image in which a color at the position at which the user performs the touch operation is added naturally.

As described with reference to FIG. 7, in the range where the color conversion ranges overlap with each other, a higher saturation reproduction rate is selected among the saturation reproduction rates set for the color conversion ranges to combine the saturation reproduction rates. However, the saturation reproduction rates may be combined in another manner.

For example, in accordance with a circular angular distance between a plurality of color conversion ranges (e.g. an angle of 72 degrees from the hue "green" to the hue "blue" in the example in FIG. 7), the saturation reproduction rates in the overlapping range may be smoothly connected in a curved manner. For example, the saturation reproduction rates are connected so as to vary in a curved manner such that a center of the overlapping range becomes minimum to combine the saturation reproduction rates. Thus, even when the saturation reproduction rates set for a plurality of color conversion ranges are complemented in a curved manner to be combined, the saturation reproduction rates in the overlapping range of the plurality of color conversion ranges are smoothly connected, thereby enabling color conversion processing to be performed without an uncomfortable feeling.

Further, in the color conversion operation described above, the RGB value (color information) corresponding to the touch position TP is obtained using the pixel (image element) corresponding to the pointed position, as an example of an image element and color information which are used when a color conversion target condition is set for the taken image (original image), but the image element may be an image consisting of a set of multiple pixels. For example, the RGB value corresponding to the touch position TP may be obtained using, as an image element, a plurality of pixels of the taken image in the vicinity of the pointed position. Specifically, in accordance with a touch position TP at which the user performs a touch operation with respect to the touch panel 13, a pointed position which is designated in a display image displayed on the lower LCD 12 (e.g. a position to which the touch position TP is perspectively projected in the display image) is calculated. Then, referring to the taken image RGB data Dc, pixels of the taken image within a predetermined distance from the calculated pointed position are extracted, and a representative RGB value for these pixels is calculated using data indicative of RGB values of these pixels. Here, the representative RGB value is an RGB value indicative of a main color in the pixels of the taken image within the predetermined distance from the pointed position. As an example, among RGB values set for the pixels of the taken image within the predetermined distance from the pointed position, an RGB value which is set most frequently is set as the representative RGB value. As another example, an average of the RGB values set for the pixels of the taken image within the predetermined distance from the pointed position is set as the representative RGB value. As described above, by obtaining the representative RGB value as the RGB value corresponding to the touch position TP, an effect of noise generated in the pixel of the taken image corresponding to the pointed position, and the like can be eliminated, and a color desired by the user can be set as a color conversion target.

Further, in the above description, the hues within the predetermined range having at a center thereof the hue according to the touch operation performed by the user with respect to the image displayed on the lower LCD 12 are set as a range of the color conversion target. Color conversion processing of increasing saturation is performed for pixels having the hues within the range. However, other color conversion processing may be performed for the pixels.

As a first example, color conversion processing of decreasing saturation is performed for the pixels having the hues within the range of the color conversion target. In this case, a real-time chromatic image taken by the inner camera 23 or the outer camera 25 (typically, a display image which is a taken image without change; a so-called live image) is displayed on the lower LCD 12, and hues within a predetermined range having at a center thereof a hue according to a touch operation performed by the user with respect the chromatic image (original image) are set as a range of the color conversion target. Then, color conversion processing of decreasing saturation is performed for pixels having the hues within the range, whereby an after-conversion image in which only a color selected by the user is changed to a monochrome color is displayed on the lower LCD 12.

As a second example, color conversion processing of increasing brightness is performed for the pixels having the hues within the range of the color conversion target. In this case, a display image obtained by changing brightness of all pixels of a real-time image (original image) taken by the inner camera 23 or the outer camera 25 to 0 (namely, a black image whose surface is filled with black) is displayed on the lower LCD 12. Then, a hue of the taken image (original image) according to a touch operation performed by the user with respect to the black image displayed on the lower LCD 12 is extracted, and hues within a predetermined range having the hue at a center thereof are set as a range of the color conversion target. Next, the color conversion processing of increasing brightness is performed for pixels having the hues within the range, whereby an after-conversion image in which only a color selected by the user appears on the black image is displayed on the lower LCD 12.

As a third example, color conversion processing of decreasing brightness is performed for the pixels having the hues within the range of the color conversion target. In this case, a real-time chromatic image taken by the inner camera 23 or the outer camera 25 (typically, a display image which is a taken image without change; a so-called live image) is displayed on the lower LCD 12, and hues within a predetermined range having at a center thereof a hue according to a touch operation performed by the user with respect the chromatic image (original image) are set as a range of the color conversion target. Then, the color conversion processing of decreasing brightness is performed for the pixels having the hue within the range, whereby an after-conversion image in which only a color selected by the user is changed to a dark color is displayed on the lower LCD 12.

As a fourth example, color conversion processing of sequentially changing hue is performed for the pixels having the hues within the range of the color conversion target. In this case, a real-time chromatic image taken by the inner camera 23 or the outer camera 25 (typically, a display image which is a taken image without change; a so-called live image) is displayed on the lower LCD 12, and hues within a predetermined range having at a center thereof a hue according to a touch operation performed by the user with respect the chromatic image (original image) are set as a range of the color conversion target. Then, for pixels having the hues within the range, the hues are changed sequentially as time passes. Thus, by performing the color conversion processing of sequentially changing hue, the taken image in which only a color selected by the user is gradually changed is displayed on the lower LCD 12.

Figure 10:
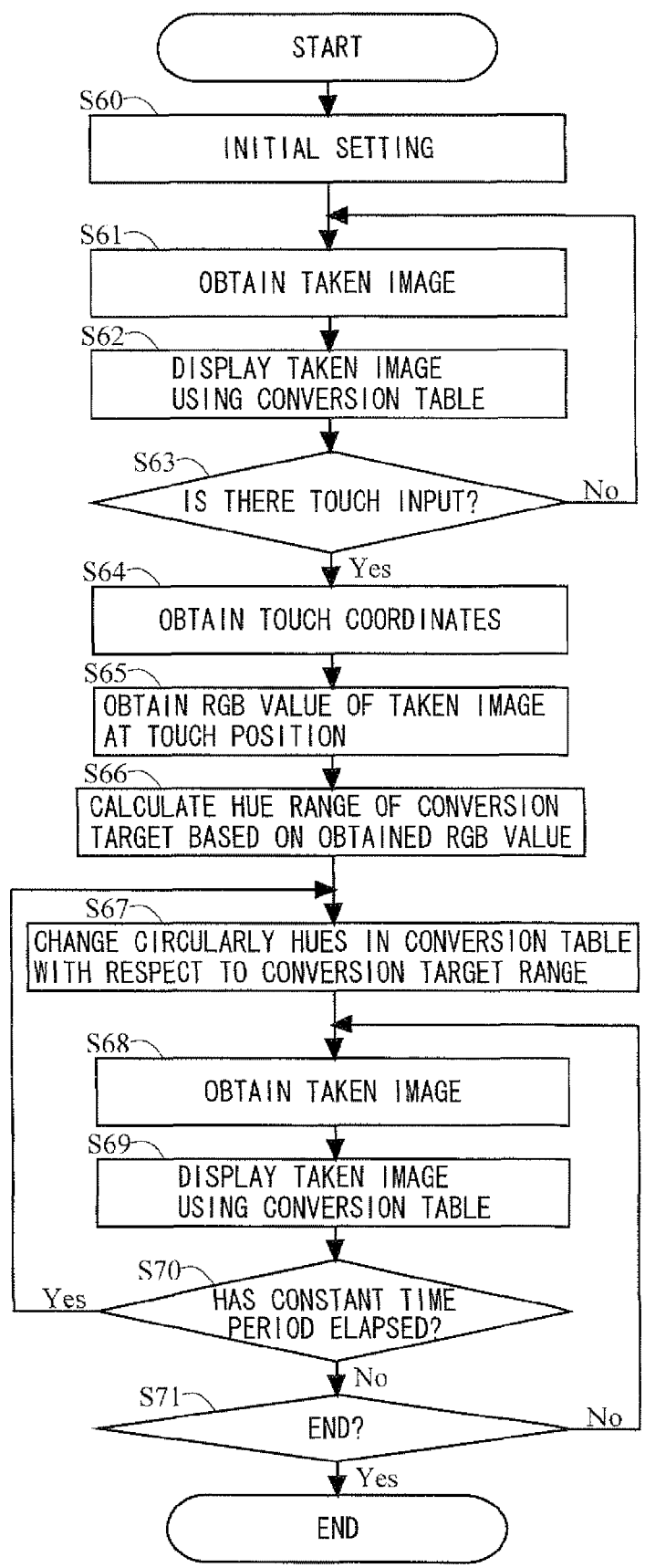
FIG. 10 is a flow chart showing another example of the color conversion processing executed by the game apparatus 1 executing the color conversion program according to the first and second embodiments of the present invention.

For example, the color conversion processing in the fourth example can be performed by the game apparatus 1 executing color conversion processing of a flow chart shown in FIG. 10. In FIG. 10, at steps 60 to 66, the CPU 31 executes the same processing as those at the above steps 50 to 56 to calculate a hue range of the conversion target.

Then, the CPU 31 circularly changes hues in the conversion table with respect to the conversion target range calculated at the step 66 (a step 67), and advances the processing to the next step 68. For example, the CPU 31 sequentially changes the hues within the conversion target range in order of a forward direction of hues arranged in the Munsell hue circle (namely, in order of red, yellow-red, yellow, green-yellow, green, blue-green, blue, purple-blue, purple, red-purple, and red) or in order of a reverse direction.

At steps 68 and 69, the CPU 31 executes the same processing as those at the above steps 51 and 52. Next, the CPU 31 determines whether or not a predetermined constant time period has elapsed (a step 70). When the constant time period has elapsed, the CPU 31 returns to the step 67, and repeats the processing. On the other hand, when the constant time period has not elapsed, the CPU 31 determines whether to terminate the color conversion processing similarly at the step 58. When not terminating the color conversion processing, the CPU 31 returns to the step 58, and repeats the processing. When terminating the color conversion processing, the CPU 31 terminates the processing by the flowchart.

As a fifth example, color conversion processing of changing hue in accordance with a color conversion relational expression is performed for the pixels having the hues within the range of the color conversion target. In this case, a real-time chromatic image taken by the inner camera 23 or the outer camera 25 (typically, a display image which is a taken image without change; a so-called live image) is displayed on the lower LCD 12, and hues within a predetermined range having at a center thereof a hue in accordance with a touch operation performed by the user with respect the chromatic image (original image) are set as a range of the color conversion target. Then, for pixels having the hues within the range, the hues are changed to predetermined hues (e.g. changed to hues having diagonal relationships in the Munsell hue circle, or hues away therefrom by a predetermined circular angle in the Munsell hue circle).

Figure 11:
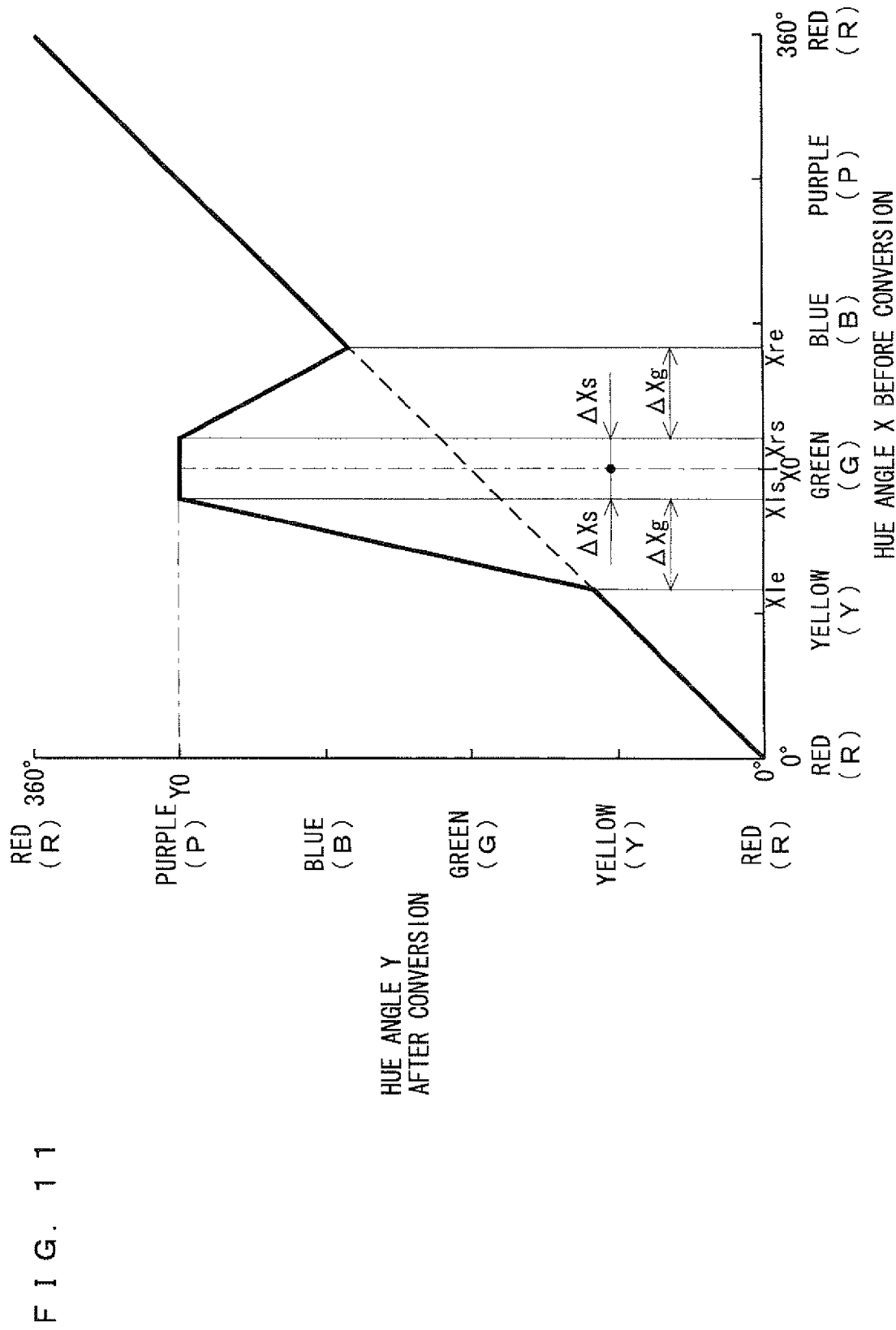
FIG. 11 is a view showing an example of a color conversion target which is set using a Munsell hue circle and an example of changing a hue with respect to the color conversion target in the first embodiment of the present invention.

Here, when the hues are changed to hues away therefrom by the predetermined circular angle in the Munsell hue circle, it is possible to perform color conversion without an uncomfortable feeling by performing color conversion which provides smooth connection between changed hues and unchanged hues. For example, similarly as the above change of the saturation reproduction rate, the set color conversion target range is set to have a range in which hues before conversion are changed to predetermined hues (referred to as conversion target hues) and a range in which hues before conversion are changed so as to be gradually increased to be close to the conversion target hues. With reference to FIG. 11, the following will describe an example of changing a hue with respect to a set color conversion target. FIG. 11 shows an example of a color conversion target which is set using the above Munsell hue circle and an example of changing a hue with respect to the color conversion target.

FIG. 11 represents an example of a color conversion relational expression in which a hue before color conversion (a real-time chromatic image (original image) taken by the inner camera 23 or the outer camera 25) is indicated as a hue angle X in the Munsell hue circle along a horizontal axis, and a hue after color conversion is indicated as a hue angle Y in the Munsell hue circle along a vertical axis. In FIG. 11, a graph indicating a relational expression between the hue angle Y and the hue angle X is represented using a heavy line.

For example, it is assumed that a hue of a pixel of a taken image which corresponds to a touch position TP by the user is green, and the green is color-converted into purple. Hereinafter, a hue angle X of the hue (e.g. the hue "green") of the pixel of the taken image which corresponds to the touch position TP is set to X0, a hue angle Y of the above conversion target hue (e.g. the hue "purple") is set to Y0. In this case, a range having a hue angle of $\Delta Xs+\Delta Xg$ before and after the hue "green" (the hue angle X0) as a center thereof in the Munsell hue circle (i.e. a range having a hue angle of $2\Delta Xs+2\Delta Xg$) is set as the range of the color conversion target.

Here, a hue angle which is smaller than the hue angle X0 by a hue angle of $\Delta Xs$ is Xls, and a hue angle which is larger than the hue angle X0 by the hue angle of $\Delta Xs$ is Xrs. In this case, all hues which belong to a range having a hue angle of $\Delta Xs$ before and after the hue "green" (the hue angle X0) as a center thereof in the Munsell hue circle, namely, all hues of hue angles X which belong to a range from the hue angle Xls to the hue angle Xrs, are converted into the conversion target hue (the hue angle Y0).

Further, a hue angle which is smaller than the hue angle Xls by a hue angle of $\Delta Xg$ is Xle. In this case, hues of hue angles X which belong to a range from the hue angle Xle to the hue angle Xls are converted into hues of hue angles Y indicated by the following equation:

$$Y = X + \text{dif} * \text{effl},$$

where $\text{effl} = (Xle - X)/(Xle - Xls)$.
Further, when $|Y0 - X| \leq 180°$, $$\text{dif} = Y0 - X, \text{ and}$$

when $|Y0 - X| \geq 180°$, $$\text{dif} = 360° - (Y0 - X).$$

Further, a hue angle which is larger than the hue angle Xrs by the hue angle of $\Delta Xg$ is Xre. In this case, hues of hue angles X which belongs to a range from the hue angle Xrs to the hue angle Xre are converted into hues of hue angles Y indicated by the following equation:

$$Y = X + \text{dif} * \text{effr},$$

where $\text{effr} = (X - Xre)/(Xrs - Xre)$.

It is noted that for pixels having hues outside the range of the color conversion target, namely, for pixels having hues of hue angles which do not belong to the range from the hue angle Xle to the hue angle Xre which has the hue angle X0 at the center thereof, the hues are not converted, and are maintained without change. In other words, for the pixels having the hues outside the range, the hue angles X are converted into hue angles Y indicated by the following equation:

$$Y = X.$$

Thus, for the pixels having the hue angles X outside the range, the hue angles X are converted into the hue angles Y of which hues are maintained without change.

It is noted that in the above example in which the relational expression between the hue angle X and the hue angle Y and the range of the color conversion target are set, the hue angle X and the hue angle Y are set in polar coordinates. Thus, it should be understood that it has to be taken into consideration that when a calculation result, or the like is beyond 360°, 360° is subtracted from the calculation result to be handled. Further, the color conversion processing operation in the fifth example is similar to the above operation based on the flow chart in FIG. 9, but instead of "changing saturation in the conversion table" at the step 57, "hue in the conversion table is changed" in accordance with the above color conversion relational expression.

As described above, according to the fifth example, by setting a range in which a hue before color conversion is color-converted so as to be gradually increased to be close to the conversion target hue white hues away within a predetermined hue angle from the hue of the pixel corresponding to the touch position TP are color-converted, a color which is originally obtained in imaging can be expressed so as to be naturally changed to a predetermined color. Further, the user can generate an image in which a desired color is converted into another color only by performing a touch operation at one point with respect to the display image displayed on the lower LCD 12. Still further, by making setting such that a hue becomes close to a hue before color conversion in a phase manner with a hue selected in accordance with a touch operation being set as a center, noise can be reduced in performing color conversion, and it is possible to convert into an image such that a color at a position at which the touch operation is performed is naturally changed.

It is noted that although, in the above description, a hue which belongs to the hue angle which is the center of the range of the color conversion target is converted into the conversion target hue, hues which belong to hue angles adjacent to the center are color-converted so as to be gradually close to the conversion target hue, other color conversion may be performed. For example, all hues which belong to hue angles within the range of the color conversion target may be cooler-converted into the above conversion target hue.

Further, although the above description is an example in the case of only once performing color conversion in accordance with a touch operation by the user with respect to a displayed image from a state where an original image (a real-time chromatic image taken by the inner camera 23 or the outer camera 25) is displayed, color conversion may be repeatedly performed after the color conversion is performed. Still further, although, in the above description, the conversion target hue is set as the hue angle Y which is a fixed value, the conversion target hue may be a value which is changed in accordance with a touch operation by the user. The following will describe a case where the conversion target hue is changed in accordance with a touch operation by the user and color conversion is repeatedly performed.

For example, it is assumed that at a certain point, a hue angle X of pixels of a taken image is changed to a hue angle f(X) by color conversion processing performed last time, and a resultant image is displayed on the screen. It is assumed that in this state, the user performs a touch operation again to further perform color conversion, the hue angle X of the pixels of the taken image is changed to a hue angle f'(X), and a resultant image is displayed on the screen. Further, it is assumed that a hue of a pixel of the taken image which corresponds to a touch position TP by the user is the hue angle X0 (the hue of the pixel corresponding to the touch position TP which is displayed on the screen is the hue angle Y0=f(X0) before the touch operation, and a hue angle Y1=f'(X0) after the touch operation). In this case, a range having a hue angle of ΔXs+ΔXg before and after the hue angle X0 as a center thereof in the Munseli hue circle (i.e. a range having a hue angle of 2ΔXs+2ΔXg) is set as the range of the color conversion target this time.

It is assumed that by the touch operation of this time, the hue of the pixel corresponding to the touch position TP which is displayed on the screen is the hue angle Y1. In other words, the conversion target hue of this time is the hue angle Y1. This value is set as a value obtained by adding a predetermined hue angle change amount A to the hue angle Y0 (=f(X0)) of the pixel corresponding to the touch position TP which is displayed on the screen before the touch operation. More specifically, the hue angle Y1 which is a new conversion target hue is represented by the following equation:

$Y1=f(X0)+A.$

In other words, if the hue angle X of the hue of the pixel of the taken image which corresponds to the touch position TP is changed to the hue angle f(X) by the color conversion processing performed last time, all hues of hue angles X which belong to the range from the hue angle Xls to the hue angle Xrs are converted into the new conversion target hue (the hue angle Y1=f(X)+A) by the color conversion processing of this time.

Further, if the hue angle X of the hue of the pixel of the taken image which corresponds to the touch position TP is changed to the hue angle f(X) by the color conversion processing performed last time, hues of hue angles X which belongs to the range from the hue angle Xle to the hue angle Xls are converted by the color conversion processing of this time into hues of hue angles f'(X) indicated by the following equation:

$f'(X)=f(X)+dif*effl.$

Here, when |Y1−f(X)|≦180°, $dif=Y1-f(X)$, and when |Y1−f(X)|>180°, $dif=360°-(Y1-f(X)).$ Y1 is a hue angle of the conversion target hue which is newly set in the color conversion processing of this time.

Further, if the hue angle X of the hue of the pixel of the taken image which corresponds to the touch position TP is changed to the hue angle f (X) by the color conversion processing performed last time, hues of hue angles X which belongs to the range from the hue angle Xrs to the hue angle Xre are converted into hues of hue angles f'(X) indicated by the following equation:

$f'(X)=f(X)+dif*effr.$

It is noted that for the pixels having hues outside the range of the color conversion target, namely, for the pixels having hues of hue angles which do not belong to the range from the hue angle Xle to the hue angle Xre which has the hue angle X0 at a center thereof, the hues are not converted, and are maintained without change even at color conversion for the second time and thereafter. In other words, if the hue angle X of the hue of the pixel of the taken image which corresponds to the touch position TP is changed to the hue angle f(X) by the color conversion processing performed last time, hue angles X of the pixels having the hues outside the range are converted into hue angles f'(X) indicated by the following equation:

$f'(X)=f(X).$

Thus, for the pixels having the hues outside the ranger the hues are maintained even at the color conversion for the second time and thereafter.

Further, when a touch operation is further performed with respect to another pixel after a hue within a first color conversion range having at a center thereof a hue of a pixel which a touch operation is performed with respect to is changed to a first hue in accordance with the touch operation by the user with respect to the above real-time chromatic image, a hue within a second color conversion range having at a center thereof a hue of the other pixel may be converted into a second hue. In this case, every time a touch position TP is obtained, a different color conversion range is set in accordance with the touch position TP, and another conversion target hue is set in accordance with the color conversion range. Thus, color conversion is performed such that a hue is changed with a different hue being set as a conversion target for each touch operation. It is noted that a conversion target hue which is set with respect to the first color conversion range may be the same as a conversion target hue which is set with respect to the second color conversion range. In this case, even when the user performs a touch operation at positions of different hues with respect to the above real-time chromatic image, the hues which the touch operation is performed with respect to are color-converted into the same hue.

It is noted that in the case where the above first color conversion range and the above second color conversion range partially overlap with each other, the above relational expression is applied even to the overlapping range where the color conversion ranges overlap with each other for each color conversion. Thus, by smoothly connecting the hue angles in the overlapping range between the first color conversion range and the second color conversion range after the conversion, it is possible to perform color conversion processing without an uncomfortable feeling.

Here, in the case where the above first color conversion range and the above second color conversion range partially overlap with each other, a hue angle may be set by another method. As a first example, among a hue angle which is set with respect to each color conversion range, a hue angle which is changed more largely (namely, a hue angle which is changed more largely from an original image) is selected. As a second example, hue angles after conversion are smoothly connected in accordance with largeness of the overlapping range between the first color conversion range and the second color conversion range. As described above, even when the hue angles in the overlapping range between the first color conversion range and the second color conversion range are combined, it is possible to perform color conversion processing without an uncomfortable feeling by smoothly connecting the hue angles in the overlapping range.

Further, in the above description, the hue of the pixel of the taken image (i.e. the original image) corresponding to the touch position TP is always a reference for a conversion target, the hue of the display image is not a reference for a conversion target. In other words, even when there is a plurality of images having the same hue in an image being displayed at a point of time, the hues of the images may be changed to different hues in the next color conversion processing in which a hue is changed further.

Figure 12A:
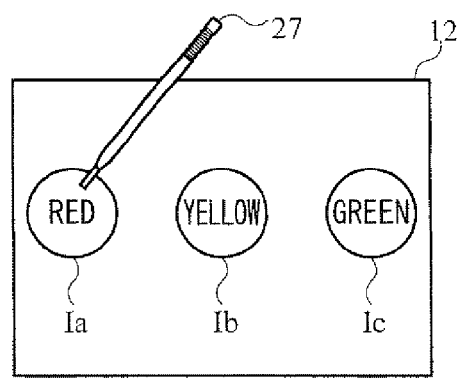
FIG. 12A is a view showing a first stage as an example where a hue in a taken image is converted.

For example, it is assumed that an original image including an image Ia having the hue of red, an image Ib having the hue of yellow, and an image Ic having the hue of green is displayed on the lower LCD 12 as shown in FIG. 12A. It is assumed that a touch operation is performed by the user with respect to the image Ia having the hue of red in the original image. In this case, hue conversion for the first time is performed for the original image in a color conversion range having the hue of red at a center thereof.

Figure 12B:
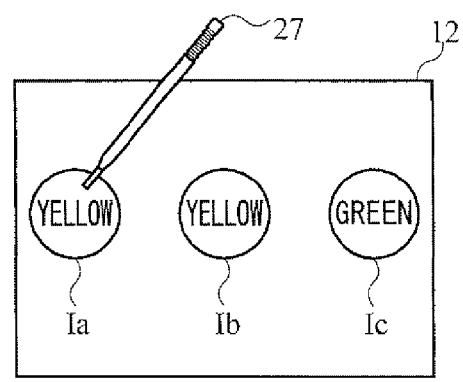
FIG. 12B is a view showing a second stage as an example where a hue in the taken image is converted.
Figure 12C:
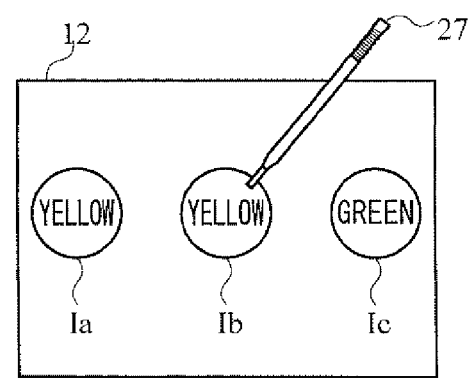
FIG. 12C is a view showing a third stage as an example where a hue in the taken image is converted.

For example, as shown in FIG. 12B, by the above hue conversion for the first time, the hue of red is converted into the hue of yellow which is 72 degrees away from the hue of red in the Munsell hue circle. Thus, the image Ia having the hue of red in the original image is converted into the hue of yellow, and a resultant image is displayed on the lower LCD 12. Then, it is assumed that the user performs a touch operation with respect to the image Ib having the hue of yellow in the display image in which the hue of red has been converted into the hue of yellow, as shown in FIG. 12C. In this case, hue conversion for the second time is performed for the original image in a color conversion range having the hue of yellow at a center thereof.

Figure 12D:
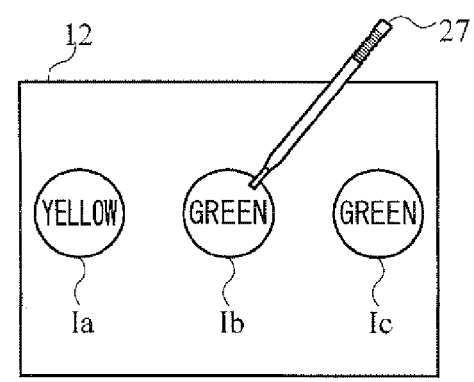
FIG. 12D is a view showing a fourth stage as an example where a hue in the taken image is converted.

For example, as shown in FIG. 12D, by the above hue conversion for the second time, the hue of yellow is converted into the hue of green which is 72 degrees away from the hue of yellow in the Munsell hue circle. Thus, the image Ib having the hue of yellow in the original image is converted into the hue of green, and a resultant image is displayed on the lower LCD 12. Here, in the display image being displayed on the lower LCD 12 prior to the above hue conversion for the second time, the image Ia is also displayed in the hue of yellow. However, as described above, because the hue of the image Ia in the original image is red and is out of the color conversion range for the above hue conversion for the second time, the image Ia does not become a target for the second hue conversion. Thus, even when the above hue conversion for the second time is performed, the hue (i.e. the hue of yellow) of the image Ia which is displayed in the hue of yellow on the lower LCD 12 prior to the above hue conversion for the second time is maintained, and the image Ia is displayed on the lower LCD 12.

As described above, because the hue of the pixel of the taken image (i.e. the original image), not of the display image being displayed on the lower LCD 12, which corresponds to the touch position TP, is always caused to be a reference for a conversion target, the images may be changed so as to have different hues in the next color conversion processing in which a hue is changed, even when there is a plurality of images having the same hue in the display image being displayed on the lower LCD 12 at a point of time. Here, if the hue of the pixel of the display image being displayed at a point of time, not of the original image, corresponding to the touch position TP, is used as a reference for a conversion target, all the hues of the display image are finally converted to the same hue by repeating hue conversion. In other words, by always causing the hue of the pixel of the taken image (i.e. the original image) corresponding to the touch position TP to be a reference for a conversion target, such a phenomenon can be avoided.

(Second Embodiment)

A color conversion apparatus executing a color conversion program according to a second embodiment of the present invention will be described with reference to drawings. In the processing based on the color conversion program according to the aforementioned first embodiment, for example, when color conversion of changing saturation is performed, from a hue away by 5 degrees from a hue which is selected in accordance with a touch position TP to a hue away by 50 degrees from the hue in the Munsell hue circle, saturation is set so as to be decreased from 100% to 0% at a linear rate. The second embodiment will be described by means of an example where saturation is decreased from 100% to 0% at a curved rate by using a Hermite interpolation method. The color conversion apparatus executing the color conversion program according to the second embodiment is the same as the color conversion apparatus of the first embodiment except that the above Hermite interpolation method is used, and thus the same components are designated by the same reference characters and the detailed description thereof will be omitted. Further, a specific processing operation performed based on the color conversion program according to the second embodiment and various data stored in a main memory 32 are the same as that of the first embodiment, and thus the detailed description thereof will be omitted.

Figure 13:
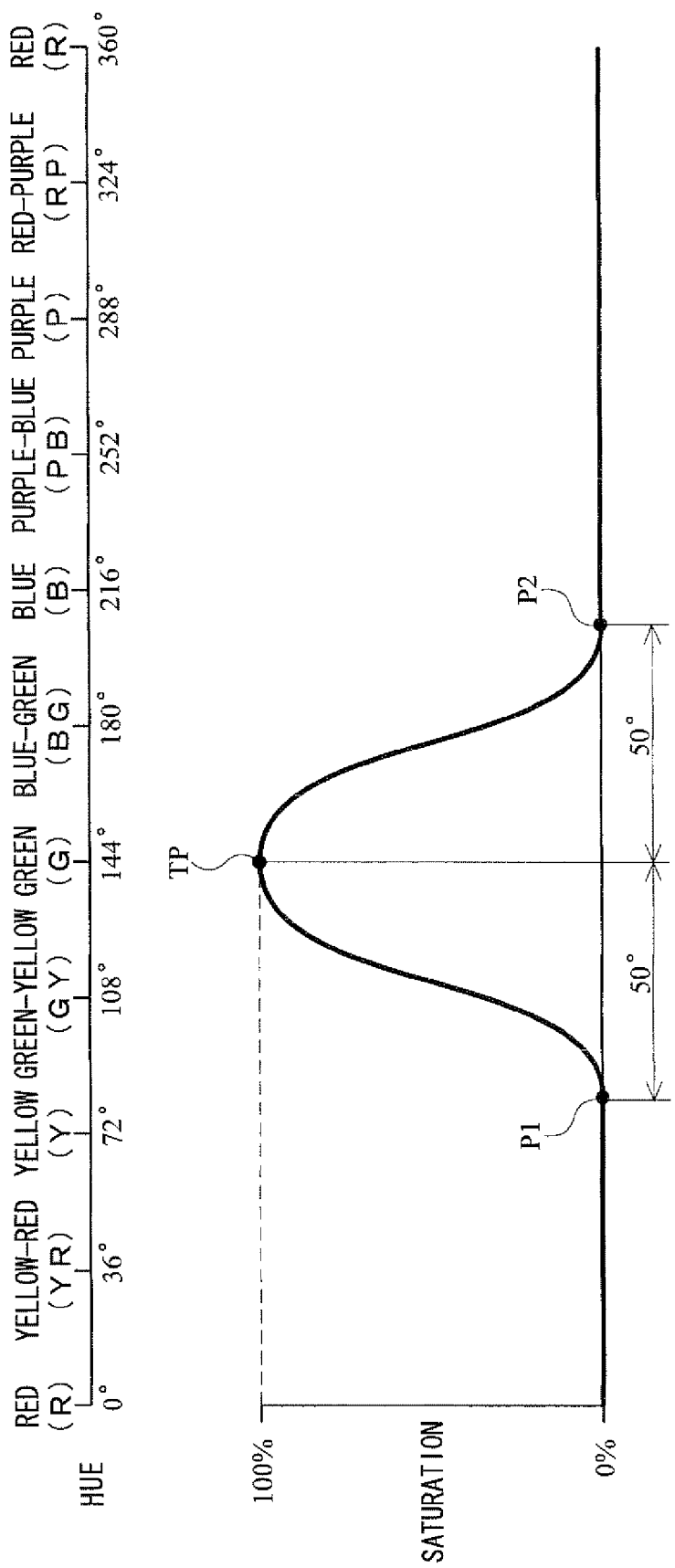
FIG. 13 is a view showing an example of a hue range determined as a conversion target with respect to a touch position TP, and an example of changing saturation with respect to the conversion target in a processing operation according to the second embodiment of the present invention.
Figure 14:
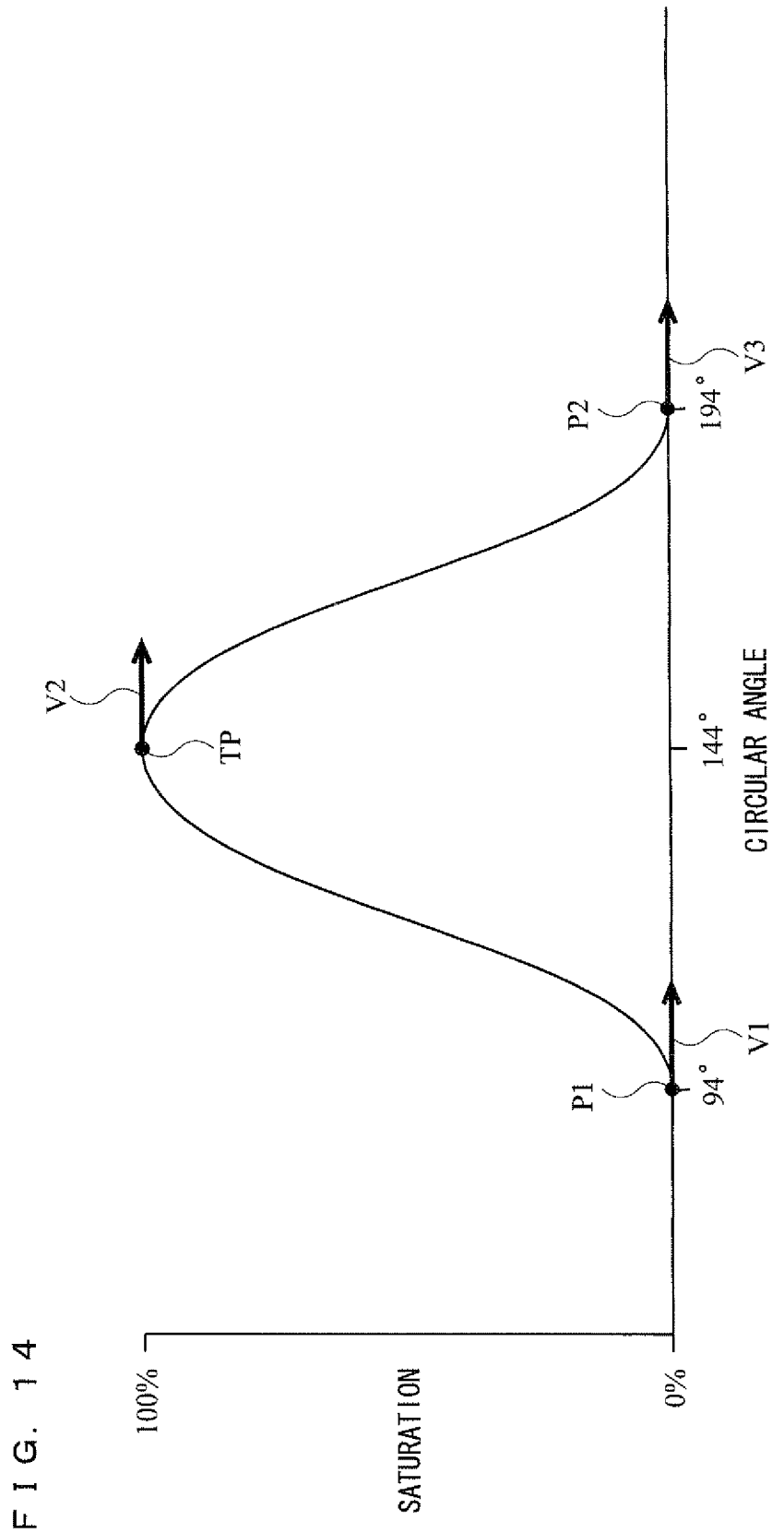
FIG. 14 is a view for explaining a Hermite interpolation method.
Figure 15:
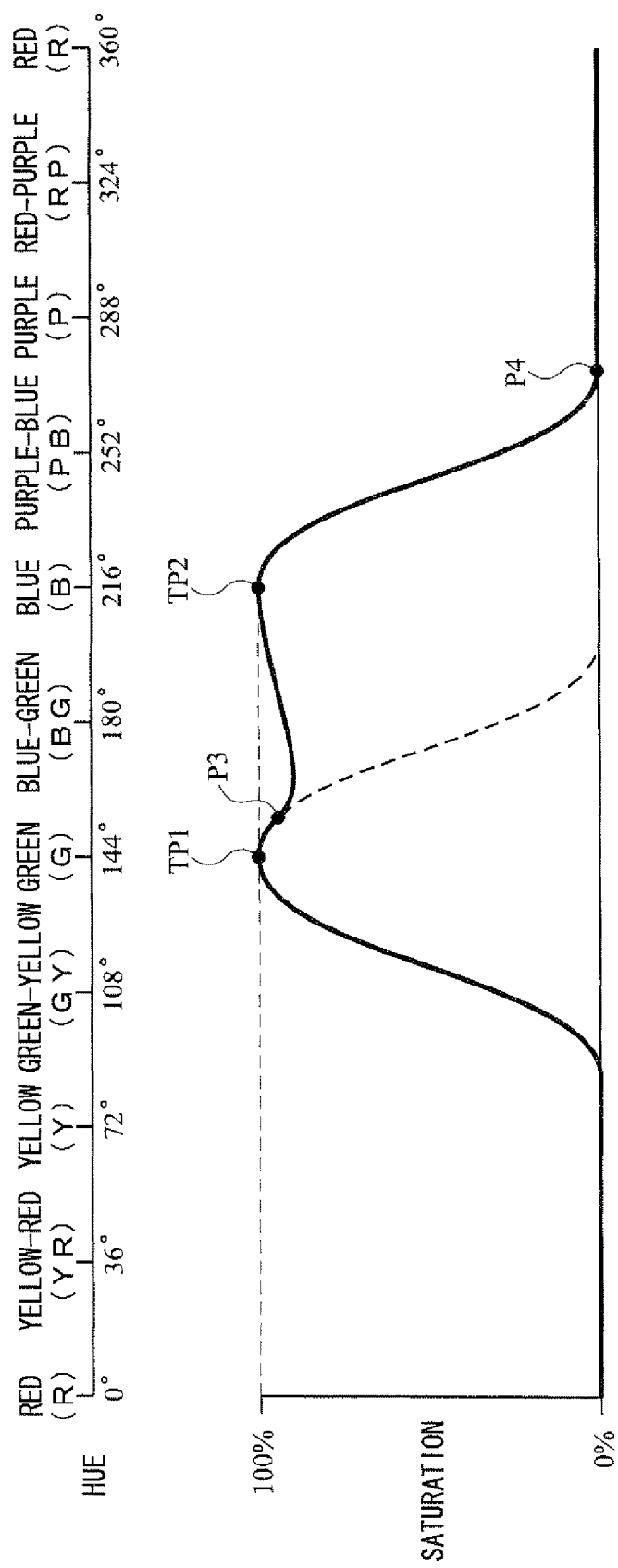
FIG. 15 is a view showing an example of hue ranges determined as conversion targets with respect to touch positions TP1 and TP2, and an example of changing saturation with respect to the conversion targets in the processing operation according to the second embodiment of the present invention.

With reference to FIGS. 13 to 15, an example of a display form being displayed on a lower LCD 12 and/or an upper LCD 22 by a processing operation according to the second embodiment will be described. FIG. 13 shows an example of a hue range determined as a conversion target with respect to a touch position TP and an example of changing saturation with respect to the conversion target in the processing operation according to the second embodiment. FIG. 14 is a view for explaining the Hermite interpolation method. FIG. 15 shows an example of hue ranges determined as conversion targets with respect to touch positions TP1 and TP2 and an example of changing saturation with respect to the conversion targets in the processing operation according to the second embodiment.

In the second embodiment, a real-time image (taken image) taken by an inner camera 23 or an outer camera 25 is displayed on the lower LCD 12 of a game apparatus 1. Then, in this embodiment, the taken image is a chromatic image, but a display image which is the monochrome image of the taken image (i.e. an achromatic image obtained by changing saturation of all pixels of the real-time image to 0) is displayed once on the lower LCD 12. Then, the saturation of the above display image is changed in accordance with the hue of the pixel of the taken image (i.e. the pixel of the original image) corresponding to a touch position on a touch panel 13 at which a touch operation is performed, and a resultant image is displayed on the lower LCD 12. Further, in the second embodiments when a hue corresponding to the color of a detected pixel and a predetermined range having the hue at a center thereof are set, a hue circle (e.g. a Munsell hue circle) described in the first embodiment is used. These things are the same as that of the first embodiment described with reference to FIGS. 3 and 4, and thus the detailed description thereof will be omitted.

With reference to FIG. 13, the following will describe an example of changing saturation with respect to a set color conversion target. FIG. 13 shows an example of a color conversion target which is set using the Munsell hue circle, and an example of changing saturation with the color conversion target.

For example, it is assumed that the hue of a pixel of a taken image corresponding to a touch position TP at which a touch operation is performed by a user is green. In this case, a color conversion range is set so as to have the hue "green" (the hue at a circular angular position of 144 degrees) at a center thereof and so as to have 50 degrees before and after the hue "green" in the Munsell hue circle (i.e. a range of 100 degrees). Then, in the set color conversion range, a saturation reproduction rate for the hue (i.e. the hue "green") of the pixel of the taken image corresponding to the touch position TP is set at 100%, and the a saturation reproduction rate for hues in the vicinity of the hue is gradually decreased from 100% to 0%.

For example, when the hue corresponding to the touch position TP is "green", the saturation reproduction rate for the hue is set at 100%, the saturation reproduction rate for each of the hues 50 degrees before and after the hue in the Munseli hue circle (i.e. the hues at circular angular positions of 94 degrees and 194 degrees) is set at 0%, and a control point is set at a position indicative of each hue and saturation reproduction rate. In FIG. 13, the hue which corresponds to the touch position TP and for which the saturation reproduction rate is set at 100% is set as a control point TP, the hues which are at positions 50 degrees before and after the hue in the Munsell hue circle and for which saturation reproduction rates are set at 0% are set as a control point P1 and a control point P2. Then, the set control points interpolated with a Hermite curve.

Here, the Hermite curve is a curve which is defined for, when a derivative between control points that are at ends of a segment is provided, interpolating the control points. For example, as shown in FIG. 14, the Hermite curve is a curve which interpolates the three control points P1, TP, and P2 when positions and tangent vectors (deviations) are provided for the three control points P1, TP, and P3, respectively.

For example, as shown in FIG. 14, the control point P1 is set at a position of a circular angle of 94 degrees and a saturation reproduction rate of 0%, and a tangentvector V1 whichhas a circular angle increasing direction at a saturation reproduction rate of 0% and has a predetermined magnitude is provided for the control point P1. The control point TP is set at a position of a circular angle of 144 degrees and a saturation reproduction rate of 100%, and a tangent vector V2 which has a circular angle increasing direction at a saturation reproduction rate of 100% and has a predetermined magnitude is provided for the control point TP. The control point P2 is set at a position of a circular angle of 194 degrees and a saturation reproduction rate of 0%, and a tangent vector V3 which has a circular angle increasing direction at a saturation reproduction rate of 0% and has a predetermined magnitude is provided for the control point P2. When a part of a curve obtained by interpolating the control points using the Hermite interpolation method is below a saturation reproduction rate of 0%, the part of the curve that is below the saturation reproduction rate of 0% is interpolated so as to have the saturation reproduction rate of 0%. When a part of the curve obtained by interpolating the control points using the Hermite interpolation method exceeds a saturation reproduction rate of 100%, the part of the curve that exceeds the saturation reproduction rate of 100% is interpolated so as to have the saturation reproduction rate of 100%.

As described above, by gradually decreasing the saturation using the Hermite interpolation method, it is possible to express an image such that a color originally obtained by imaging is added naturally to the monochrome image. Further, the user can easily generate an image in which a desired color is added, only by performing a touch operation at one position with respect to the display image displayed on the lower LCD 12. Further, the hue which is selected in accordance with the touch operation is set as a center, and the saturation is set so as to be decreased smoothly. Thus, noise can be reduced in performing color conversion, and it is possible to convert into an image in which the color at the position at which the touch operation is performed is naturally added.

With reference to FIG. 15, the following will describe an example where, when the user performs a touch operation at a plurality of positions, the saturation is changed with respect to a color conversion target which is set in accordance with each touch operations. FIG. 15 shows an example of color conversion targets which are set using the Munsell hue circle, and an example of changing saturation with respect to the color conversion targets.

For example, as shown in FIG. 15, it is assumed that a hue of a pixel of the taken image corresponding to a first touch position TP1 at which a touch operation is performed by the user for the first time is green. In this case, similarly as in FIG. 14, a first color conversion range is set so as to have the hue "green" at a center thereof and so as to have 50 degrees before and after the hue "green" in the Munsell hue circle. Further, a saturation reproduction rate for the first color conversion range is the same as that in the example described with reference to FIG. 14, and thus the detailed description thereof will be omitted.

Next, it is assumed that a hue of a pixel of the taken image corresponding to a second touch position TP2 at which a touch operation is performed by the user for the second time is blue. In this case, similarly as the first color conversion range, a second color conversion range is set so as to have the hue "blue" at a center thereof and so as to have 50 degrees before and after the hue "blue" in the Munsell hue circle. In the set second color conversion range, a saturation reproduction rate for the hue (i.e. the hue "blue") of the pixel of the taken image corresponding to the second touch position TP2 is set at 100%, and a saturation reproduction rate for hues in the vicinity of the hue is gradually decreased from 100% to 0%.

Here, as shown in FIG. 15, when the hue corresponding to the second touch position TP2 is "blue" (at a circular angular position of 216 degrees), a control point TP2 is set at the circular angular position of the hue, and control points P3 and P4 are set at positions indicative of hues (i.e. the hues at circular angular positions 166 degrees and 266 degrees) 50 degrees before and after the hue in the Munsell hue circle. However, as shown in FIG. 15, the first color conversion range, which is set with respect to the hue "green", and the second color conversion range, which is set with respect to the hue "blue", partially overlap with each other.

In this case, as shown in FIG. 15, the control point TP2 is set at a position of a circular angle of 216 degrees and a saturation reproduction rate of 100%, and a tangent vector which has a circular angle increasing direction at a saturation reproduction rate of 100% and has a predetermined magnitude is provided for the control point TP2. The control point 24 is set at a position of a circular angle of 266 degrees and a saturation reproduction rate of 0%, and a tangent vector which has a circular angle increasing direction at a saturation reproduction rate of 0% and has a predetermined magnitude is provided for the control point P4. The control point P3 which is in the range where the first color conversion range and the second color conversion range overlap with each other is set on the already set Hermite curve, and a tangent vector which is tangent to the Hermite curve is provided for the control point P3. In other words, the control point P3 is set at a position of a circular angle 166 degrees on the Hermite curve which is set with respect to the first touch position TP1. Then, a tangent vector which is tangent at the control point P3 to the Hermite curve which is set with respect to the first touch position TP1 and has a circular angle increasing direction and a predetermined magnitude is provided for the control point P3. Then, the three control points P3, TP2 and P4 are interpolated with a Hermite curve by using the positions and the tangent vectors of the three control points P3, TP2, and P4. In this manner, by combining, with the Hermite interpolation method, saturation reproduction rates which are set with respect to a plurality of color conversion ranges, the saturation reproduction rates can be connected smoothly in a range where the plurality of color conversion ranges overlap with each other, thereby enabling color conversion processing to be performed without an uncomfortable feeling.

The above has described an example of the color conversion processing, in which hues within a predetermined range having at a center thereof a hue in accordance with a touch operation performed by the user with respect to an image being displayed on the lower LCD 12 are set as a range of a color conversion target and the saturation of pixels having the hues within this range is increased. However, similarly as in the first embodiment, other color conversion processing may be performed with respect to the pixels.

As a first example, color conversion processing of decreasing saturation is performed for the pixels having the hues within the range of the color conversion target. As a second example, color conversion processing of increasing brightness is performed for the pixels having the hues within the range of the color conversion target. As a third example, color conversion processing of decreasing brightness is performed for the pixels having the hues within the range of the color conversion target. As a fourth example, color conversion processing of sequentially changing hue is performed for the pixels having the hues within the range of the color conversion target. These first to fourth examples are the same as that of the first embodiment, and thus the detailed description thereof will be omitted.

As a fifth example, color conversion processing of changing hue in accordance with a color conversion relational expression is performed for the pixels having the hues within the range of the color conversion target. In this case, a real-time chromatic image taken by the inner camera 23 or the outer camera 25 (typically, a display image which is a taken image without change) is displayed as an original image on the lower LCD 12, and hues within a predetermined range having at a center thereof a hue in accordance with a touch operation performed by the user with respect to the chromatic image are set as a range of the color conversion target. Then, for pixels having the hues within the above range, the hues are changed to predetermined hues (e.g. changed to hues having diagonal relationships thereto in the Munsell hue circle, or hues away therefrom by a predetermined circular angle in the Munsell hue circle).

Figure 16:
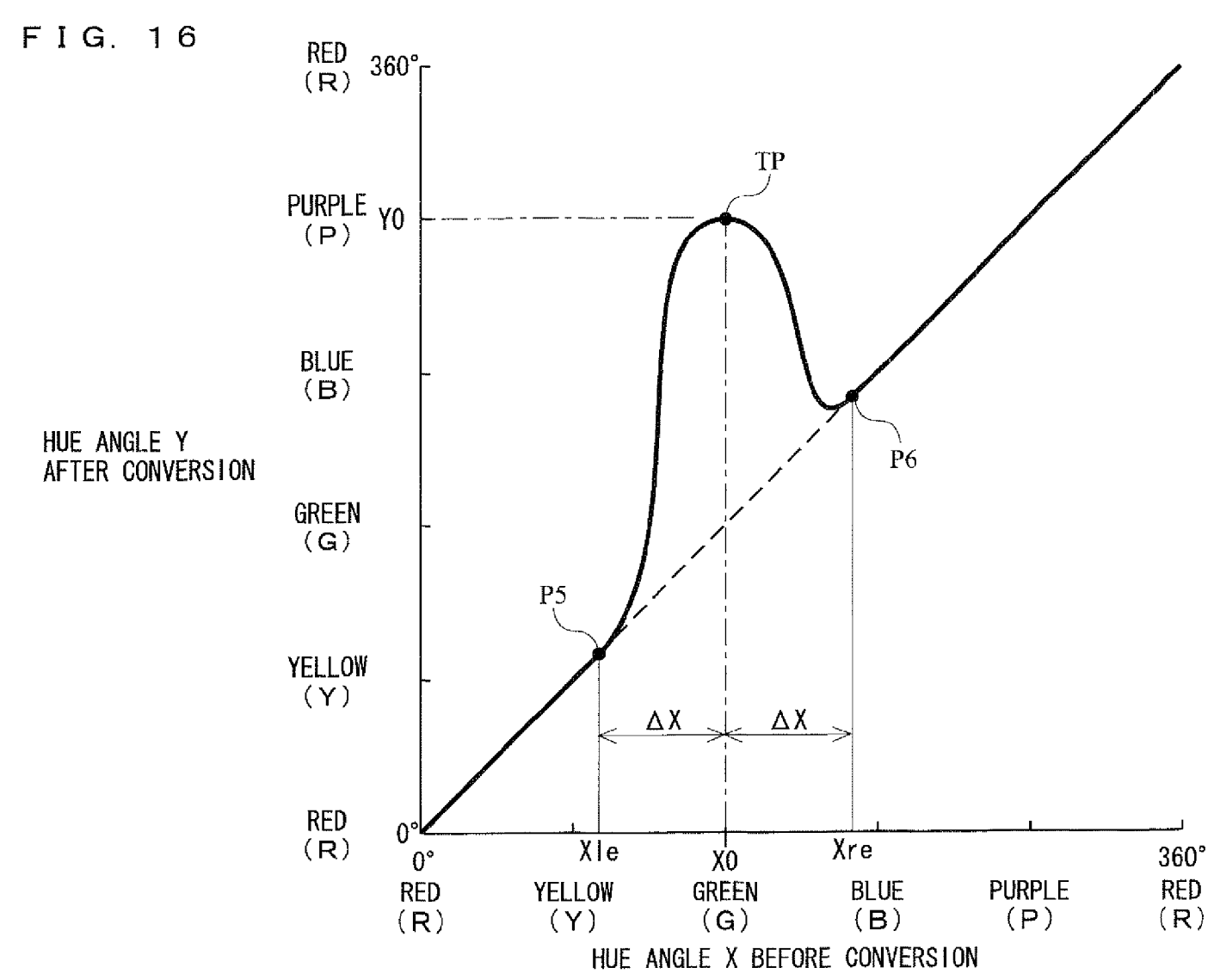

Here, when the hues are changed to hues which are away therefrom by the predetermined circular angle in the Munsell hue circle, it is possible to perform color conversion without an uncomfortable feeling by performing color conversion by which a Hermite curve connects changed hues and unchanged hues. For example, similarly as the above change of the saturation reproduction rate, in the set color conversion target range, the hue, before conversion, which corresponds to the touch position is changed to a predetermined hue (referred to as a conversion target hue), and hues, before conversion, in the vicinity of the hue are changed so as to be gradually increased to be close to the conversion target hue. With reference to FIG. 16, the following will describe an example of changing hue with respect to the set color conversion target. FIG. 16 shows an example of a color conversion target which is set using the aforementioned Munsell hue circle, and an example of changing hue with respect to the color conversion target.

FIG. 16 represents an example of a color conversion relational expression in which a hue before color conversion (of a real-time chromatic image taken by the inner camera 23 or the outer camera 25) is indicated as a hue angle X in the Munsell hue circle along a horizontal axis, and a hue after color conversion is indicated as a hue angle Y in the Munsell hue circle along a vertical axis. In FIG. 16, a graph indicating the relational expression between the hue angle Y and the hue angle X is represented using a heavy line.

For example, it is assumed that a hue of a pixel of a taken image which corresponds to a touch position TP at which a touch operation is performed by the user is green, and the green is converted into purple. Hereinafter, a hue angle X of the hue (e.g. the hue "green") of the pixel of the taken image which corresponds to the touch position TP is set to X0, a hue angle Y of the above conversion target hue (e.g. the hue "purple") is set to Y0. In this case, a range having the hue "green" (the hue angle X0) at a center thereof and having a hue angle of ΔX before and after the hue "green" in the Munsell hue circle (i.e. a range having a hue angle of 2ΔX) is set as a range of the color conversion target.

Then, the hue angle X0 is changed to the hue angle Y0, the hues which are at positions ΔX before and after the hue in the Munsell hue circle are not changed (i.e. Y=X), and a control point is set at a position indicative of each hue angle. In FIG. 16, a position of hue angles where (X,Y)=(X0,Y0), which corresponds to the touch position TP, is set as a control point TP, and hue angles Xle and Xre which are at positions ΔX before and after the hue in the Munsell hue circle are set as a control point P5 and a control point P6, respectively. Then, interpolation is performed among the set control points by using a Hermite curve.

Specifically, the control point TP is set at a position of hue angles where (X,Y)=(X0,Y0), and a tangent vector which has a hue angle X increasing direction (i.e. a direction where Y=Y0) at a hue angle of Y0 and has a predetermined magnitude is provided for the control point TP. The control point P5 is set at a position of the hue angle Xle where the hue is not changed, namely, at a position of the hue angle Xle where Y=X (where (X,Y)=(Xle, Xle). Then, a tangent vector which has a hue angle X increasing direction where the hue angle is not changed (namely, a direction where Y=X) and has a predetermined magnitude is provided for the control point P5. The control point P6 is set at a position of the hue angle Xre where the hue is not changed, namely, at a position of the hue angle Xre where Y=X (where (X,Y)=(Xre,Xre). Then, a tangent vector which has a hue angle X increasing direction where the hue angle is not changed (namely, a direction where Y=X) and has a predetermined magnitude is provided for the control point P6. Then, the three control points P5, TP and P6 are interpolated with a Hermite curve by using the positions and the tangent vectors of the three control points P5, TP and P6.

For pixels having hues outside the range of the color conversion target, namely, for pixels having hues which are out of the range, from the hue angle Xle to the hue angle Xre, which has the hue angle X0 at a center thereof, the hues are not changed and are maintained. In other words, for the pixels having the hues outside this range, their hue angles X are converted into hue angles Y represented by the following formula:

Y=X.

Thus, for the pixels having the hue angles X outside this range, hue angles X are converted into hue angles Y such that the hues are maintained without change.

Further, when a part of the Hermite curve obtained by interpolating the control points by the Hermite interpolation method protrudes below a part where Y=X, namely, when the hue angle X is converted into a hue angle Y lower than the hue angle X, the protruding part of the Hermite curve is interpolated to be a straight line where Y=X.

Further, in the aforementioned example of converting the hue angle X into the hue angle Y and the aforementioned example of setting the range of the color conversion target, the hue angle X and the hue angle Y are set in a polar coordinate. Thus, it should be understood that, when a calculated value exceeds 360 degrees, the calculated value is handled such that 360 degrees is subtracted from the calculated value. In addition, because the hue angle is set in the polar coordinate, a method of performing interpolation clockwise in the polar coordinate and a method performing interpolation anticlockwise in the polar coordinate are considered when two control points are interpolated. For example, in order to reduce a change in angle of hue, interpolation needs to be performed in the direction in which the hue angle difference between the control points becomes small, and this method is used in the aforementioned embodiment. However, when such a effect of reducing a change in angle of hue is not desired, interpolation may be performed in the direction in which the hue angle difference between the control points becomes great, or interpolation may be performed clockwise or anticlockwise in the polar coordinate such that this direction is fixed. Further, the color conversion operation in the fifth example is similar to the operation of the first embodiment based on the flow chart in FIG. 9, and it is sufficient that "changing saturation in the conversion table" at the above step 57 is changed to "changing hue in the conversion table" in accordance with the method of converting hue.

As described above, according to the fifth example, while hues away within a predetermined hue angle from the hue of the pixel corresponding to the touch position TP are color-converted, interpolation is performed with a Hermite curve and the hues before color conversion are color-converted so as to be gradually increased to be close to the conversion target hue. Thus, a color which is originally obtained in imaging can be expressed so as to be naturally changed to a predetermined color. Further, the user can generate an image in which a desired color is converted into another color, only by performing a touch operation at one point with respect to the display image being displayed on the lower LCD 12. Still further, by making settings such that a hue smoothly gets close to a hue before color conversion with a hue selected in accordance with a touch operation being set as a center, noise can be reduced in performing color conversion, and it is possible to convert into an image such that a color at a position at which the touch operation is performed is naturally changed.

Although the above has described an example in the case of only once performing color conversion in accordance with a touch operation performed by the user with respect to an original image (a real-time chromatic image taken by the inner camera 23 or the outer camera 25) being displayed, color conversion may be repeatedly performed after the color conversion is performed. The following will describe an example of repeatedly performing color conversion in accordance with a touch operation performed by the user.

The case where, after the user performs a touch operation with respect to the above chromatic image at a first touch position TP1 and hues within a first color conversion range having at a center thereof a hue of the pixel corresponding to the first touch position TP1 are converted into first hues, another touch operation is performed at a second touch position TP2, is considered. In this case, hues within a second color conversion range having at a center thereof a hue of the pixel corresponding to the second touch position TP2 are also converted into second hues.

Figure 17A:
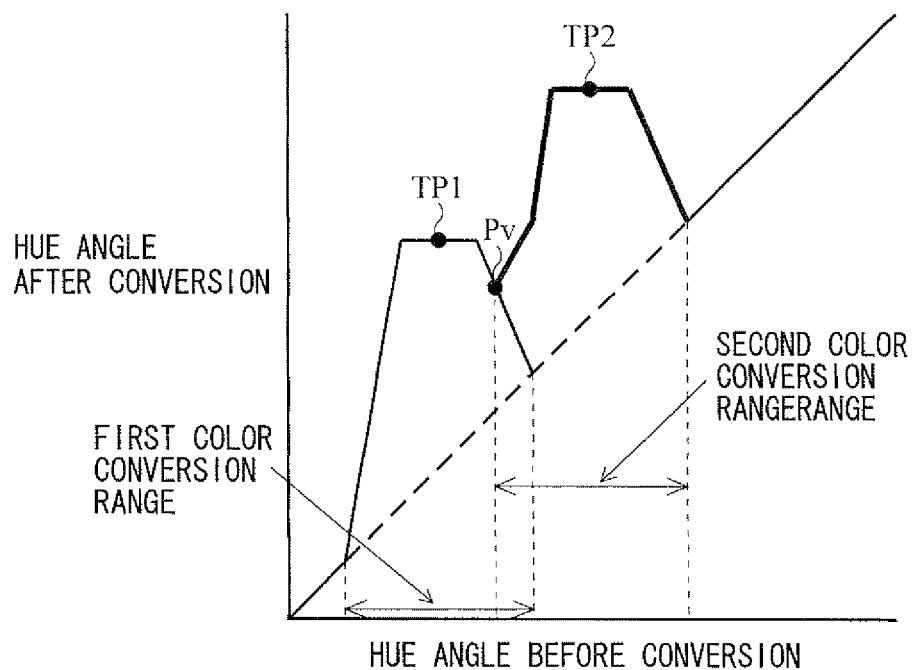
FIG. 17A is a view for explaining an example of color conversion processing when a first color conversion range and a second color conversion range partially overlap with each other in the first embodiment of the present invention.
Figure 18A:
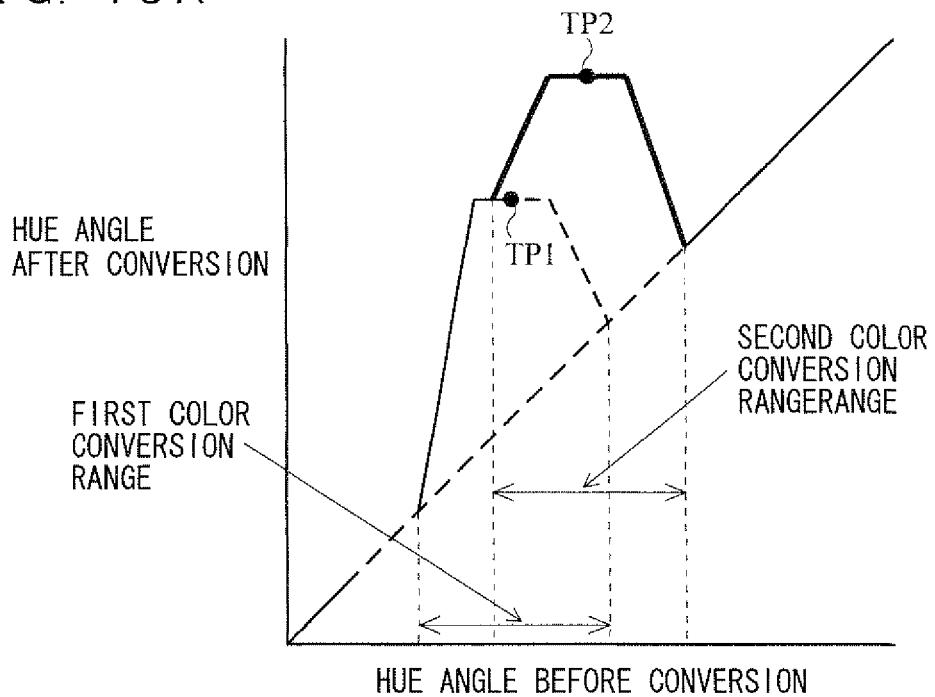
FIG. 18A is a view for explaining another example of color conversion processing when a first color conversion range and a second color conversion range partially overlap with each other in the first embodiment of the present invention.

For example, as shown in FIGS. 17A and 18A, when the first color conversion range and the second color conversion range partially overlap with each other, in the color conversion processing by using the relational expression described in the first embodiment, the relational expression is used for each color conversion in the range where the first color conversion range and the second color conversion range partially overlap with each other. Thus, by smoothly connecting the alter-conversion hue angles in the range where the first color conversion range and the second color conversion range partially overlap with each other, it is possible to perform color conversion processing without an uncomfortable feeling.

Figure 17B:
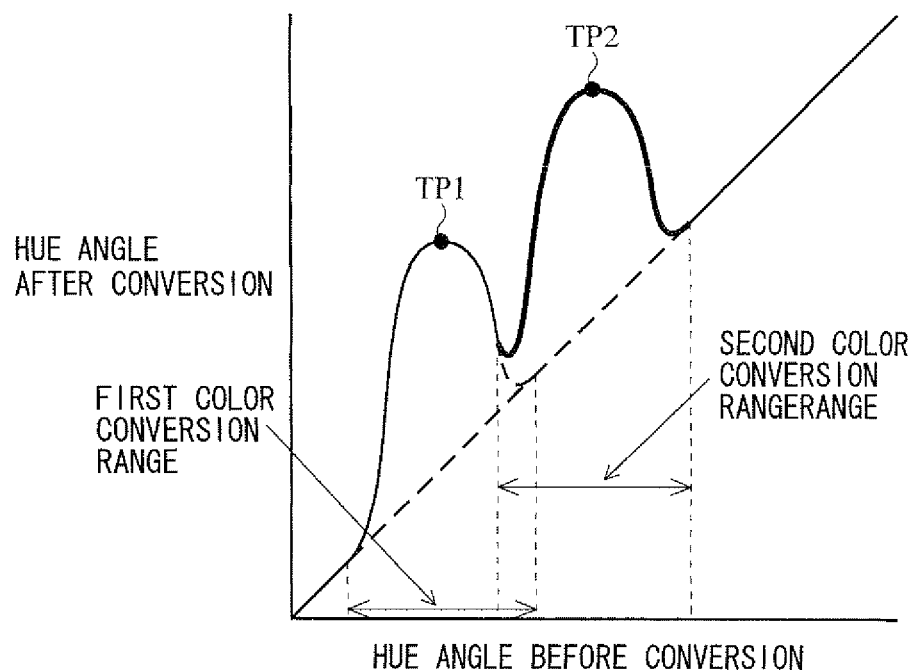
FIG. 17B is a view for explaining an example of color conversion processing when a first color conversion range and a second color conversion range partially overlap with each other in the second embodiment of the present invention.
Figure 18B:
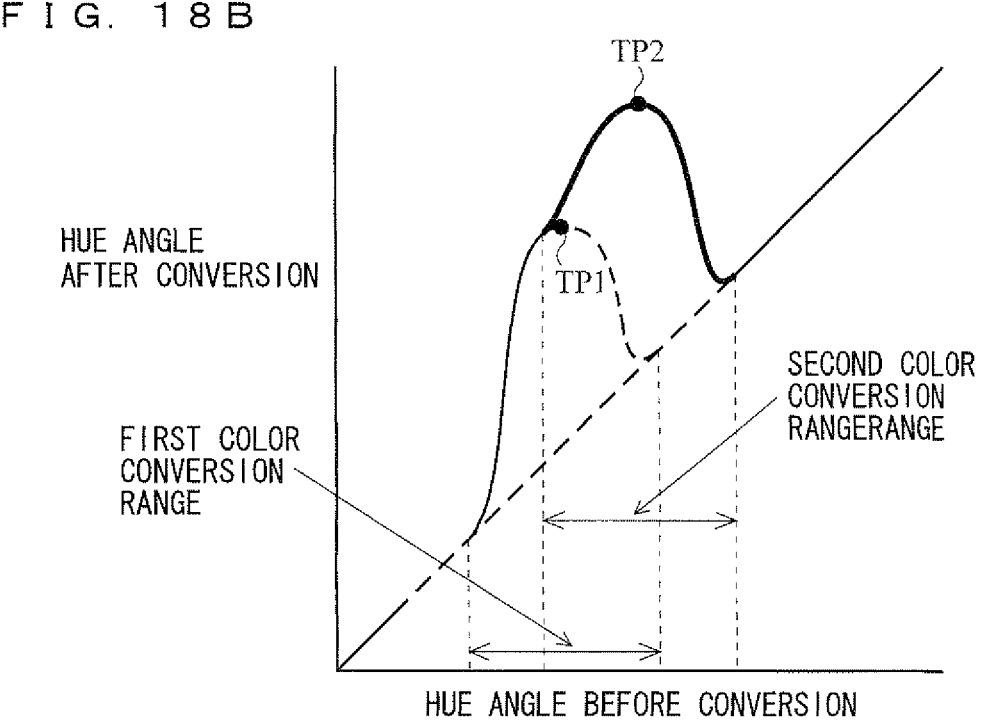
FIG. 18B is a view for explaining another example of color conversion processing when a first color conversion range and a second color conversion range partially overlap with each other in the second embodiment of the present invention.

On the other hand, as shown in FIGS. 17B and 18B, when the first color conversion range and the second color conversion range partially overlap with each other, in the color conversion processing by using the Hermite interpolation method, color conversion is performed in the second color conversion range by using the Hermite curve which has been already set for the first color conversion range.

For example, color conversion processing for the first time is performed in a range (first color conversion range) which has at a center thereof a hue of the pixel of the original image corresponding to the first touch position TP1 and has a hue angle of ΔX before and after the hue in the Munsell hue circle. Then, the hue angle of the pixel of the original image corresponding to the first touch position TP1 is set to X1, and the hue angle of a conversion target hue for the hue angle X1 is set to Y1. In this case, as described with reference to FIG. 16, control points are respectively set at a position of the hue angles, corresponding to the first touch position TP1, where (X,Y)=(X1,Y1), and at positions of hue angles (a hue angle X1−ΔX and a hue angle X1+ΔX) away from the hue angle by ΔX in the Munsell hue circle. Then, the set control points are interpolated with a Hermite curve.

Then, color conversion processing for the second time is performed in a range (second color conversion range) which has at a center thereof a hue of the pixel of the original image corresponding to the second touch position TP2 and has a hue angle of ΔX before and after the hue in the Munsell hue circle. Then, the hue angle of the pixel of the original image corresponding to the second touch position TP2 is set to X2, and the hue angle of a conversion target hue for the hue angle X2 is set to Y2. In this case, control points are respectively set at a position of the hue angles, corresponding to the first touch position TP1, where (X,Y)=(X2,Y2), and at positions of hue angles (a hue angle X2−ΔX and a hue angle X2+ΔX) away from the hue angle by ΔX in the Munsell hue circle.

Specifically, the control point corresponding to the second touch position TP2 is set at the position of the hue angles where (X,Y)=(X2,Y2), and a tangent vector which has a hue angle X increasing direction at the hue angle Y2 (namely, a direction where Y=Y2) and has a predetermined magnitude is provided for this control point. Of the hue angles away from the hue angle X2 by ΔX in the Munsell hue circle, the control point (e.g. the control point at the hue angle X2+Δ) on the side where the first color conversion range and the second color conversion range do not overlap with each other is set at a position where the hue is not changed, namely, at a position of the hue angle X2+Δwhere Y=X (a hue angle where (X, Y) (X2+ΔX, X2+ΔX), and a tangent vector which has a hue angle X increasing direction where the hue angle is not changed (namely, a direction where Y=X) and has a predetermined magnitude is provided for this control point.

On the other hand, of the hue angles away from the hue angle X2 by ΔX in the Munsell hue circle, the control point (e.g. the control point at the hue angle X2−Δ) on the side where the first color conversion range and the second color conversion range overlap with each other is set at a position of the hue angle X2−ΔX on the Hermite curve which has been already set for the first touch position TP1, and a tangent vector which is tangent to the Hermite curve is provided for this control point. Specifically, a tangent vector which is tangent at the above control point to the Hermite curve, which has been already set for the first touch position TP1, and has a hue angle X increasing direction and a predetermined magnitude is provided for the above control point. Then, the control points which are set in the second color conversion range are interpolated with a new Hermite curve.

For example, FIG. 17B shows the case where the first color conversion range and the second color conversion range partially overlap with each other in a state where the hue angle X1 of the original image corresponding to the first touch position TP1 is relatively away from the hue angle X2 of the original image corresponding to the second touch position TP2. In this case, a mountain-shaped Hermite curve which is set for the first color conversion range and a mountain-shaped Hermite curve which is set for the second color conversion range overlap with each other at the skirts of their mountain shapes. When the first color conversion range and the second color conversion range overlap with each other at such a proportion, a wedge-shaped valley (a point Pv shown in FIG. 17A) is formed at the part where the two mountain shapes overlap with each other in the color conversion processing in the first embodiment as shown in FIG. 17A, and thus this is thought to be a cause of noise in performing color conversion. However, when hue angles in the range where the first color conversion range and the second color conversion range overlap with each other are combined by using the Hermite interpolation method, the two mountain-shaped Hermite curves are connected to each other in a curved manner, and thus the hue angles in the overlapping range after conversion are connected more smoothly and it is possible to perform color conversion processing without an uncomfortable felling.

Further, FIG. 18B shows the case where the first color conversion range and the second color conversion range partially overlap with each other in a state where the hue angle X1 of the original image corresponding to the first touch position TP1 is relatively close to the hue angle X2 of the original image corresponding to the second touch position TP2. In this case, a mountain-shaped Hermite curve which is set for the first color conversion range and a mountain-shaped Hermite curve which is set for the second color conversion range overlap with each other from the vicinity of the top of the mountain-shaped Hermite curve for the first color conversion range. When the first color conversion range and the second color conversion range overlap with each other at such a proportion, the two mountain shapes simply overlap with each other and a plurality of convexities are formed in the color conversion processing in the first embodiment as shown in FIG. 18A. However, when hue angles in the range where the first color conversion range and the second color conversion range overlap with each other are combined by using the Hermite interpolation method, the skirt of the mountain-shaped Hermite curve which is set for the second color conversion range is smoothly connected to the mountain-shaped Hermite curve which is set for the first color conversion range, in the vicinity of its top, and the curved line which has been already set among the control points is neglected. Thus, when the hue angles in the range where the first color conversion range and the second color conversion range overlap with each other are combined by suing the Hermite interpolation method, because convexities are unlikely to be accumulated to generate a large number of convexities, the hue angles are combined as if there was one mountain-shaped curve. Thus, in the Hermite interpolation method, the after-conversion hue angles in the overlapping range are connected more smoothly and it is possible to perform color conversion processing without an uncomfortable felling.

In the above description of the first and second embodiments, the color conversion processing of changing one of color attributes (three attributes, namely, saturation, brightness, and hue) is performed for the pixels having the hues within the range of the color conversion target. However, for pixels having hues outside the range, the color conversion processing may be performed. For example, for the pixels having the hues outside the range, processing which is different from the color conversion processing performed for the pixels having the hues within the range (e.g. a color attribute to be changed is different, or a color attribute to be changed is the same but a direction of change is different) is performed, thereby enabling various color conversion processing to be easily performed with respect to the taken image. Here, if the direction of change is different, when the color conversion processing of increasing saturation or brightness within the range is performed, color conversion processing of decreasing saturation or brightness outside the range is performed. Or, when color conversion processing of changing the hues within the range is performed in order of the forward direction in a color system, color conversion processing of changing the hues outside the range is performed in order of the reverse direction in the color system.

Further, in the above description of the first and second embodiments, an RGB value of each pixel of a taken image is converted into a hue using the conversion table to generate a display image, and color conversion is performed such that at least one of saturation, brightness, and hue which are described in the conversion table is changed. However, color conversion may be performed by another method. For example, image data may be changed by directly changing at least one of saturation, brightness, and hue of an image being displayed (e.g. a taken image) without changing the conversion table with respect to a calculated conversion target range.

Further, in the above description of the first and second embodiments, a real-time image (a taken image) taken by the inner camera 23 or the outer camera 25 is used as an image to be color-converted. However, another image may be the image to be color-converted. For example, the game apparatus 1 is capable of performing a photographing instruction by the user pressing a predetermined button, and an image taken in accordance with the photographing instruction may be an image to be treated with the color conversion processing of the present invention. Further, it may be configured to store the aforementioned after color-conversion image in the stored data memory 34 or the memory card 28 in accordance with a predetermined operation.

More specifically, the user can perform a instruction to perform photographing using the inner camera 23 or the outer camera 25 by pressing the operation button 14G or the operation button 14H of the game apparatus 1. Then, by the photographing processing, an image taken by the inner camera 23 or the outer camera 25 can be stored in the stored data memory 34 or the memory card 28. If, at the step 51, the CPU 31 obtains the image obtained by such photographing processing, the image stored once in the stored data memory 34 or the memory card 28 can be used as an image to be treated with the color conversion processing of the present invention.

It should be understood that the image stored in the stored data memory 34 or the memory card 28 is not limited to an image taken by the game apparatus 1, and even if the image stored in the stored data memory 34 or the memory card 28 is another image (an image taken by another apparatus, an image obtained by communication with another apparatus, an image pre-installed in the stored data memory 34 or the memory card 28, and the like), the image may be used as an object to be treated with the color conversion processing of the present invention. Further, an image pre-installed in the memory card 29 (e.g. a game image displayed by a game program stored in the memory card 29) may be used as the object to be treated with the color conversion processing of the present invention. In these cases, it should be understood that even if the game apparatus 1 does not have an imaging function, such as the inner camera 23, the outer camera 25, and the like, the present invention can be realized.

Further, the case where the game apparatus 1 takes and stores (photographs) a still image using the inner camera 23 and the outer camera 25 has been described as an example. However, in addition to the still image, the game apparatus 1 may take and store (photograph) a moving image using the inner camera 23 or the outer camera 25. In this case, the moving image taken and stored (photographed) using the inner camera 23 or the outer camera 25 is used as an image to be treated with the color conversion processing of the present invention.

The game apparatus 1 may change an LCD for displaying a real-time image taken by the inner camera 23 or the outer camera 25, for example, between the upper LCD 22 and the lower LCD 12 in accordance with a change instruction from the user, or may cause a real-time image taken by the inner camera 23 or the outer camera 25 to be displayed on both LCDs. In this case, a taken image, namely, a display image which has been treated with the color conversion processing of the present invention, is also displayed on the upper LCD 22. Alternatively, an original image (taken image) may be displayed on one (e.g. the lower LCD 12) of two LCDs, and an after-conversion image which has been subjected to color conversion processing of the present invention may be displayed on the other (e.g. the upper LCD 22) of the two LCDs.

Further, in the embodiments described above, the case where the lower LCD 12 and the upper LCD 22 physically separated from each other are arranged one above the other (the case of two screens above and below) has been described as an example of a LCD display section having two screens. However, a configuration of a display section having two screens may be another configuration. For example, the lower LCD 12 and the upper LCD 22 may be arranged on a main surface of the lower housing 11 laterally side by side. Alternatively, a vertically long LCD having the same width as that of the lower LCD 12 and a vertical length which is twice as large as that of the lower LCD 12 (namely, an LCD which is physically one unit and has a display size with a vertical length equal to a sum of vertical lengths of two screens may be provided in the main surface of the lower housing 11, and the above two images (namely, a display image obtained by changing a taken image to a monochrome image, and an image showing an operation explanation screen) may be displayed one above the other (displayed so as to be adjacent to each other without a boundary portion between above and below). Still alternatively, a horizontally long LCD having the same vertical length as that of the lower LCD 12 and a width which is twice as large as that of the lower LCD 12 may be provided in the main surface of the lower housing 11, and the two game images may be displayed laterally side by side (displayed so as to be adjacent to each other without a boundary portion between left and right). In other words, a physically one screen may be divided into two and used to display two images. In either form of an image, if the touch panel 13 is provided on a screen on which the display image displayed on the lower LCD 12 is displayed, the present invention can be realized similarly. Alternatively, in the case where the physically one screen is divided into two and used to display the two images, the touch panel 13 may be provided on an entirety of the screen.

Further, in the embodiments described above, the game apparatus 1 is provided integrally with the touch panel 13. However, even if the game apparatus and the touch panel may be provided independently of each other, it should be understood that the present invention can be realized. Alternatively, the touch panel 13 may be provided on an upper surface of the upper LCD 22, and the display image displayed on the lower LCD 12 may be displayed on the upper LCD 22. Further, although the two display screens (the lower LCD 12 and the upper LCD 22) are provided in the above embodiments, only one display screen may be provided. In other words, in the above embodiments, the upper LCD 22 may not be provided, only the lower LCD 12 may be provided as a display screen, and the touch panel 13 may be provided on the lower LCD 12. Still alternatively, in the above embodiments, the lower LCD 12 may not be provided, the touch panel 13 may be provided on the upper surface of the upper LCD 22, and the display image displayed on the lower LCD 12 may be displayed on the upper LCD 22.

Further, in the embodiments described above, as input means of the game apparatus 1 for realizing an coordinate input, the touch panel 13 is used. However, another pointing device may be used. Here, the pointing device is an input device for designating an input position or coordinates on a screen, and, for example, a mouse, a trackpad, a trackball, or the like is used as the input device. When position information in a screen coordinate system calculated from an output value outputted from the input device is used, the present invention can be realized similarly.

In this case, when the position information in the screen coordinate system is treated as a touch position TP, the present invention can be realized. In this regard, instead of the determination as to whether or not there is an input such as a touch-on, a touch-off, and the like in the above processing, existence/nonexistence of or change in another input from the input means which is different from the input of the position information is used. For example, a determination as to whether or not an operation button provided in the input means is pressed (e.g. right click or left click of the mouse) is used instead of the determination of the touch-on or the touch-off.

Further, in the case of a stationary game apparatus whose game controller is held by a player while a game is played, a pointing device in another form is considered. For example, a camera fixed to a housing of the game controller can be used as the pointing device. In this case, in accordance with change in a position at which the housing of the game controller is pointed, an image taken by the camera is changed. Thus, by analyzing the taken image, coordinates at which the housing is pointed with respect to a display image can be calculated.

In this case, when the coordinates indicative of the position at which the housing is pointed is treated as a touch position TP, the present invention can be realized. In this regard, instead of the determination as to whether or not there is an input such as a touch-on, a touch-off, and the like in the above processing, existence/nonexistence of or change in another input from the game controller which is different from the coordinate input is used. As a first example, a determination as to whether or not an operation button provided in the game controller is pressed (e.g. a touch-on is performed when an A button is pressed) is used instead of the determination of the touch-on or the touch-off. In a second example, the game controller includes two housings. A camera is provided in one of the two housings, and a detection section, such as an acceleration sensor for outputting a signal in accordance with movement of the other housing, and the like, is fixed to the other housing. In this case, a determination in accordance with the movement of the other housing (e.g. a touch-on is performed when the housing is inclined in a predetermined direction) is used instead of the determination of the touch-on or the touch-off. In a third example, voice input means such as a microphone or the like is provided in the housing of the game controller. In this case, a determination to switch between a touch-on and a touch-off when the player produces a predetermined voice is used instead.

Further, the above embodiments has been described using the hand-held game apparatus 1 and the stationary game apparatus. However, the present invention may be realized by an information processing unit, such as a common personal computer and the like, executing the color conversion processing program of the present invention.

Further, the shape of the above game apparatus 1, and the shapes, numbers, and installed positions of the operation buttons 14 and the touch panel 13 provided therein are merely an example, and the present invention can be realized with other shapes, numbers and installed positions. Further, the set values and the determination values which are used in the above color conversion processing are merely an example, and the present invention can be realized with other values.

The storage medium having stored thereon the color conversion program, and the color conversion apparatus, according to the present invention, are useful as apparatuses which are capable of performing color conversion desired by the user with respect to a displayed image in accordance with an easy operation and perform color conversion of various images such as taken images or take an image with a camera, and the like, and as programs executed by these apparatuses, and the like.

While the invention has been described in detail, the foregoing description is in all aspects illustrative and not restrictive. It is understood that numerous other modifications and variations can be devised without departing from the scope of the invention. It is understood that the scope of the present invention is determined only by the claims. It is understood that those skilled in the art can implement the present invention in the equivalent range based on the description of the present invention and common technical knowledge, from the description of the specific embodiments of the present invention. It is understood that the contents of the patent, the patent application, and the document that are cited in the present specification are incorporated herein by reference, similarly as when the contents are specifically described in the present specification.

Further, it is understood that throughout the present specification, a singular form includes a concept of a plural form as long as no mention is made thereto. Thus, it is understood that an article or an adjective of a singular form (e.g. "a", "an", "the", and the like in the case of English) includes a concept of a plural form as long as no mention is made thereto. It is understood that terms used in the present specification each have a general meaning in the art as long as no mention is made thereto. Thus, unless defined particularly, all the technical terms used in the present specification have the same meanings as that understood generally by those skilled in the art to which the present invention pertains. When a term is in contradiction with its general meaning, the present specification (including definition) is prioritized.

What is claimed is:

1. A non-transitory computer-readable storage medium storing computer readable instructions for execution by a processing system of an information processing apparatus that is configured to accept user input and taken image data outputted repeatedly from an imager, the stored instructions comprising instructions configured to:

display, on a display device, at least a first image in a plurality of images, the plurality of images based on the repeatedly outputted taken image data, the plurality of images also including a remainder of images;

determine a first coordinate associated with the first image in accordance with accepted user input;

obtain color information of an image element of the first image that, corresponds to the first coordinate;

set a first conversion target condition in accordance with the obtained color information;

perform color conversion processing to change color information of at least one image element in each one of the remainder of images that satisfies the first conversion target condition; and output, to a display device, an after-conversion image in accordance with each one of the changed remainder of images on the display device.

2. The non-transitory computer-readable storage medium according to claim 1, wherein:

each image element of the at least one image element of the remainder of images is a pixel.

3. The non-transitory computer-readable storage medium according to claim 1, wherein the instructions are further configured to:

determine a second coordinate in accordance with provided user input when a first after-conversion image is being displayed to the display device;

obtain second color information of an image element of the first image that corresponds to the second coordinate;

set a second conversion target condition in accordance with the obtained second color information; and perform color conversion processing on image elements in another image that satisfy the first conversion target condition or the second conversion target condition.

4. The non-transitory computer-readable storage medium according to claim 1, wherein the instructions are further configured to:

obtain a second image that is different from the first image; and perform color conversion processing to change color information of each pixel from the second image that satisfies the first conversion target condition and output a result to the display device.

5. The non-transitory computer-readable storage medium according to claim 1, wherein the first conversion target condition includes a condition related to at least one of hue, saturation, and/or brightness.

6. The non-transitory computer-readable storage medium according to claim 1, wherein the color information includes at least one of a saturation, a brightness, and/or a hue of a color.

7. The non-transitory computer-readable storage medium according to claim 1, wherein the instructions are further configured to:

obtain a hue of the image element;

set a hue range with the obtained hue at a center thereof, the first conversion target condition including the set hue range; and determine a target hue, wherein the at least one image element in the remainder of images is changed such that a hue of the at least one image element that is close to the center is changed to be closer to the determined target hue than a hue of the at least one image element that is distant from the determined target hue.

8. The non-transitory computer-readable storage medium according to claim 1, wherein a change amount from color information of an image element having a hue close to the center of the hue range is increased for image elements having a hue within the hue range of the first conversion target condition compared to image elements having a hue distant from the center of the hue range.

9. The non-transitory computer-readable storage medium according to claim 1, wherein:

the first conversion target condition is a range including the color information of the image element corresponding to the first coordinate, and the second conversion target condition is a second range including the color information of the image element corresponding to the second coordinate;

for each image element of the first image, which has color information within the first range, the color conversion processing:

sets, to 0, a change amount from color information of an image element having first color information that is color information at a boundary of the first range;

sets, to a predetermined amount, a change amount from color information of an image element having second color information that is color information at a predetermined non-boundary portion of the first range; and sets a change amount from color information of each image element having color information other than the first color information and the second color information among color information within the first range, so as to be gradually increased as color information gets closer to the second color information from the first color information; and for each image element of the first image, which has color information within the second range, the color conversion processing further:

sets, to 0, a change amount from color information, after a color conversion, of an image element having third color information that is color information at a boundary of the second range;

sets, to a predetermined amount, a change amount from color information, after the color conversion, of an image element having fourth color information that is color information at a predetermined non-boundary portion of the second range; and sets a change amount from color information of each image element having color information other than the third color information and the fourth color information among color information within the second range, so as to be gradually increased as color information gets closer to the fourth color information from the third color information.

10. The non-transitory computer-readable storage medium according to claim 1, wherein the at least one image element in the remainder of images is changed based on a Hermite curve as the hue of an image element gets away from the center.

11. The non-transitory computer-readable storage medium according to claim 1, wherein the instructions are further configured to:

set a conversion target hue based on the hue of the obtained color information, wherein a hue of the color information of the at least one image element that satisfies the first conversion target condition is set to the conversion target hue.

12. The non-transitory computer-readable storage medium according to claim 1, wherein:

a hue of the color information of the at least one image element that satisfies the first conversion target condition is set to the conversion target hue; and the conversion target hue is changed over time with resultant images being changed thereby.

13. The non-transitory computer-readable storage medium according to claim 1, wherein the instructions are further configured to:

obtain a hue of the image element that corresponds to the first coordinate;

set hue range having the obtained hue at a center thereof the hue range;

wherein the changed color information of the at least one image element includes at least one of saturation, brightness, and hue when the hue of the respective image element is within the hue range of the first conversion target condition; and after an after-conversion image is output for display, the instructions are further configured to:

determine a second coordinate within the output after-conversion image;

obtain a second hue associated with the first image that corresponds to the second coordinate;

set a second hue range with the obtained second hue at a center thereof, the second conversion target condition including the second hue range; and change at least one of saturation, brightness, and hue with respect to an image element of the first image which has a hue within the second hue range of the second conversion target condition.

14. The non-transitory computer-readable storage medium according to claim 1, wherein the instructions are further configured to:
   obtain a hue that corresponds to the first coordinate associated with the first image;
   set a hue range with the obtained hue at a center thereof, the first conversion target condition including the hue range;
   change a hue of an image element of the at least one image element in the remainder of images to a first conversion target hue; and
   when the after-conversion image of at least one of the changed remainder of images is being displayed to a user:
      determine a second coordinate in accordance with user provided input;
      obtain a second hue of an image element of the first image that corresponds to the second coordinate;
      set a second hue range having the obtained second hue at a center thereof, a second conversion target condition including the second hue range; and
      change a hue of an image element of the at least one image element in the remainder of images to that is within the second hue range into a second conversion target hue.

15. The non-transitory computer-readable storage medium according to claim 1, wherein the hue range and the second hue range overlap by at least an overlapping hue range,
   wherein hues within the overlapping hue range are changed so as to be close to the second conversion target hue based on the hue obtained by change for the hue range of the first conversion target condition.

16. The non-transitory computer-readable storage medium according to claim 1, wherein the second conversion target hue is set based on a hue associated with the after-conversion image of an image of the changed remainder of images that corresponds to the second coordinate.

17. The non-transitory computer-readable storage medium according to claim 1, wherein the instructions are further configured to:
   when the after-conversion image of an image in the changed remainder of images is being displayed:
      determine a second coordinate in accordance with user provided input;
      obtain color information of a second image element from the first image that corresponds to the second coordinate;
      set a second conversion target condition in accordance with the obtained color information; and
      perform color conversion processing for at least one subsequent image for image elements that satisfy the second conversion target condition.

18. A color conversion apparatus that is configured to receive user provided input via an input device and a plurality of images output by an imager, the color conversion apparatus comprising:
   a processing system including at least one processor, the processing system configured to:
      output a first image to a display device, the first image included among the plurality of images;
      determine a first coordinate in accordance with user input provided via the input device;
      obtain color information of an image element of the first image that corresponds to the determined first coordinate;
      set a first conversion target condition in accordance with the obtained color information; and
      perform a color conversion process on a plurality of remainder images included among the plurality of images by changing color information of image elements in the plurality of remainder images that satisfy the first conversion target condition;
      output, to the display device, after-conversion images based on the color conversion process performed on the plurality of remainder images.

19. The apparatus of claim 18, wherein the first coordinate is a associated with the user provided input that is provided to the display device that is displaying the first image, the first coordinate being within a displayed area of the first image on the display device.

20. The apparatus of claim 18, wherein the first conversion target condition includes a hue range and image elements that satisfy the first conversion target condition are image elements having a hue value within the hue range.

21. An image processing system for color converting an image, the system comprising:
   a storage medium that is configured to store first image data that is in accordance with a first image;
   a display device that includes at least one screen, the display device configured to display a second image that is based on second image data on the at least one screen, the second image being different from the first image;
   a processing system that includes at least one processor, the processing system configured to:
      while the second image is displayed, receive input that indicates a position that is within an area where the second image is being displayed on the at least one screen of the display device;
      select first color information from the first image data based on the received input of the indicated position within the second image;
      set a condition of color conversation based on the selected first color information;
      select a plurality of image elements associated with the second image that satisfy the set condition of color conversation;
      perform color conversion processing including generating adjusted color information of the selected plurality of images elements associated with the second image; and
      output, to the display device, a color adjusted image that is based on the generated adjusted color information of the selected plurality of images elements.

22. A method of color converting a displayed image, the method comprising:
   storing first image data that is in accordance with a first image;
   outputting, to a display device that includes at least one screen, a second image that is based on second image data, the second image being different from the first image;
   while the second image is displayed, receiving input from a user that indicates a position that is within an area where the second image is being displayed on the at least one screen of the display device;
   selecting first color information from the first image data based on the received input of the indicated position within the second image;

setting, via a processing system that includes at least one processor, a condition of color conversation based on the selected first color information;

selecting, via the processing system, a plurality of image elements associated with the second image that satisfy the set condition of color conversation;

performing, via the processing system, color conversion processing that includes generating adjusted color information on the selected plurality of image elements associated with the second image; and outputting, to the display device, a color adjusted image that is based on the generated adjusted color information of the selected plurality of images elements.

23. The non-transitory computer-readable storage medium according to claim 1, wherein the plurality of images is formed as a movie obtained by the imager with the remainder of images subjected to the performed color conversion processing being output subsequent to the first image in the real-time movie.

* * * * *